(12) United States Patent
Lee et al.

(10) Patent No.: US 12,555,404 B2
(45) Date of Patent: Feb. 17, 2026

(54) DISPLAY DEVICE HAVING BIOMETRIC FUNCTION AND OPERATION METHOD THEREOF

(71) Applicant: Samsung Display Co., Ltd., Yongin-Si (KR)

(72) Inventors: Soojung Lee, Suwon-si (KR); Suk Kim, Hwaseong-si (KR); Yuna Kim, Seoul (KR); Keumdong Jung, Seoul (KR); Goeun Cha, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 1094 days.

(21) Appl. No.: 17/025,007

(22) Filed: Sep. 18, 2020

(65) Prior Publication Data

US 2021/0117637 A1    Apr. 22, 2021

(30) Foreign Application Priority Data

Oct. 21, 2019  (KR) .................. 10-2019-0130772

(51) Int. Cl.
*G06V 40/13* (2022.01)
*A61B 5/00* (2006.01)

(52) U.S. Cl.
CPC .......... *G06V 40/1306* (2022.01); *A61B 5/442* (2013.01)

(58) Field of Classification Search
CPC .. G06V 40/1306; A61B 5/442; A61B 5/6898; A61B 5/1172; A61B 5/7445; A61B 5/443; A61B 5/444; A61B 5/445; A61B 5/446; A61B 5/117; A61B 5/1174
USPC ................................. 600/587, 306
See application file for complete search history.

(56) References Cited

U.S. PATENT DOCUMENTS

| | | | |
|---|---|---|---|
| 5,986,746 A | * 11/1999 | Metz | A61B 5/1172 356/71 |
| 10,497,748 B2 | 12/2019 | Panchawagh et al. | |
| 10,579,848 B2 | 3/2020 | Kim et al. | |
| 10,783,387 B2 | 9/2020 | Jung et al. | |
| 10,802,643 B2 | 10/2020 | Park et al. | |
| 11,024,693 B2 | * 6/2021 | Cho | G06F 1/1675 |
| 11,188,728 B2 | 11/2021 | Park | |
| 2005/0063573 A1 | * 3/2005 | Setlak | G06V 40/10 382/124 |

(Continued)

FOREIGN PATENT DOCUMENTS

| | | |
|---|---|---|
| CN | 105807981 A | 7/2016 |
| CN | 108573214 A | 9/2018 |

(Continued)

OTHER PUBLICATIONS

Examination report dated Feb. 13, 2025 issued in corresponding Chinese Patent Application No. 202011130146.X.

*Primary Examiner* — Navin Natnithithadha
(74) *Attorney, Agent, or Firm* — F. CHAU & ASSOCIATES, LLC

(57) ABSTRACT

A display device includes a display panel configured to display an image. A biometric sensor module is disposed on the display panel. The biometric sensor module is configured to output a first transmission signal having a first frequency to sense fingerprint information in a fingerprint sensing mode. The biometric sensor is also configured to output a second transmission signal having a second frequency that is different from the first frequency to sense skin condition information in a skin measuring mode.

12 Claims, 16 Drawing Sheets

(56) References Cited

U.S. PATENT DOCUMENTS

| | | | |
|---|---|---|---|
| 2008/0194928 A1* | 8/2008 | Bandic | A61B 5/443 600/306 |
| 2018/0094974 A1* | 4/2018 | Won | G01N 21/31 |
| 2018/0276439 A1* | 9/2018 | Strohmann | G06F 1/169 |
| 2018/0276440 A1* | 9/2018 | Strohmann | G06V 40/1359 |
| 2018/0276443 A1* | 9/2018 | Strohmann | G06V 40/1394 |
| 2019/0125249 A1* | 5/2019 | Rattner | A61B 5/6898 |
| 2019/0138123 A1 | 5/2019 | Jung et al. | |
| 2019/0155329 A1 | 5/2019 | Lee et al. | |
| 2020/0044003 A1* | 2/2020 | Cho | G09F 9/30 |
| 2020/0050818 A1* | 2/2020 | He | G06V 40/1324 |
| 2020/0345294 A1* | 11/2020 | Varghese | A61B 5/0537 |

FOREIGN PATENT DOCUMENTS

| | | |
|---|---|---|
| CN | 108766330 A | 11/2018 |
| CN | 109394273 A | 3/2019 |
| CN | 109755275 A | 5/2019 |
| CN | 110163070 A | 8/2019 |
| KR | 10-2018-0066096 | 6/2018 |
| KR | 10-2019-0037760 | 4/2019 |
| KR | 10-2019-0056714 | 5/2019 |
| KR | 10-2019-0062143 | 6/2019 |
| WO | WO2018174459 A1 | 9/2018 |

* cited by examiner

DISPLAY DEVICE HAVING BIOMETRIC FUNCTION AND OPERATION METHOD THEREOF

CROSS-REFERENCE TO RELATED APPLICATIONS

This application claims priority under 35 U.S.C. § 119 to Korean Patent Application No. 10-2019-0130772, filed on Oct. 21, 2019 in the Korean Intellectual Property Office, the disclosure of which is incorporated by reference in its entirety herein.

1. TECHNICAL FIELD

The present inventive concepts relate to a display device, and more particularly, to a display device capable of sensing biometric information of the user.

2. DISCUSSION OF RELATED ART

Numerous multi-media devices include a display device for displaying an image, such as a television, a mobile phone, a tablet computer, a navigator, or a game player. The display device may be provided with an input sensing panel for receiving a touch-based input which enables a user to easily input information or a command intuitively and conveniently, without utilizing a button, a keyboard, or a mouse.

Recently, display devices for multi-media devices have been developed which perform the biometric detection process of fingerprint recognition for user authentication means for online banking, product purchase, security, or the like.

SUMMARY

The present inventive concepts provides a display device capable of measuring skin elasticity using a biometric sensor for sensing a biometric fingerprint input.

The present inventive concepts also provides an operation method of a display device capable of sensing a fingerprint and measuring the skin elasticity.

In an exemplary embodiment of the present inventive concepts, a display device includes a display panel configured to display an image. A biometric sensor module is disposed on the display panel. The biometric sensor module is configured to output a first transmission signal having a first frequency to sense fingerprint information in a fingerprint sensing mode. The biometric sensor is also configured to output a second transmission signal having a second frequency that is different from the first frequency to sense skin condition information in a skin measuring mode.

In an exemplary embodiment, the biometric sensor module may be an ultrasonic sensor module, and each of the first transmission signal and the second transmission signal may be an ultrasonic signal.

In an exemplary embodiment, the display panel may include an image area in which an image is displayed, and a bezel area, and the biometric sensor module may transmit one of the first transmission signal and the second transmission signal to a sensing area corresponding to a part of the image area.

In an exemplary embodiment, the biometric sensor module may include: a biometric sensor module including a plurality of detection sensors configured to output any one of the first transmission signal and the second transmission signal, and receive any one piece of the fingerprint information and the skin condition information; a selection circuit configured to control operations of the plurality of sensors; and an output circuit configured to output a receiving signal corresponding to any one piece of the fingerprint information and the skin condition information sensed by the plurality of detection sensors.

In an exemplary embodiment, each of the plurality of detection sensors may transmit the first transmission signal having the first frequency in the fingerprint sensing mode, and transmit the second transmission signal having the second frequency in the skin measuring mode.

In an exemplary embodiment, the output circuit may output a first receiving signal corresponding to the fingerprint information in the fingerprint sensing mode, and output a second receiving signal corresponding to the skin condition information in the skin measuring mode.

In an exemplary embodiment, the plurality of detection sensors may include: first detection sensors configured to transmit the first transmission signal having the first frequency in the fingerprint sensing mode; and second detection sensors configured to transmit the second transmission signal having the second frequency in the skin measuring mode.

In an exemplary embodiment, the first detection sensors and the second detection sensors may be alternately arranged in a prescribed direction.

In an exemplary embodiment, each of the second detection sensors may have a larger size than each of the first detection sensors.

In an exemplary embodiment, the number of the first detection sensors may be greater than that of the second detection sensors.

In an exemplary embodiment, the first frequency of the first transmission signal may be lower than the second frequency of the second transmission signal.

In an exemplary embodiment, the first frequency of the first transmission signal may be set to a prescribed frequency of a range of about 10 MHz to 20 MHz, and the second frequency of the second transmission signal may be set to a prescribed frequency of a range of about 10 kHz to 50 kHz.

In an exemplary embodiment of the present inventive concepts, a display device includes a display panel configured to display an image. A biometric sensor module is disposed on the display panel and is configured to receive biometric information. The biometric sensor module comprises first detection sensors configured to transmit a first transmission signal having a first frequency to receive fingerprint information in a fingerprint sensing mode. The biometric sensor module further comprises second detection sensors configured to transmit a second transmission signal having a second frequency that is different from the first frequency, to receive skin condition information in a skin measuring mode.

In an exemplary embodiment, each of the first detection sensors and the second detection sensors may be an ultrasonic sensor, and each of the first transmission signal and the second transmission signal may be an ultrasonic signal.

In an exemplary embodiment, the first detection sensors and the second detection sensors may be alternately arranged in a prescribed direction.

In an exemplary embodiment, each of the second detection sensors may have a larger size than each of the first detection sensors.

In an exemplary embodiment, the first frequency of the first transmission signal may be lower than the second frequency of the second transmission signal.

In an exemplary embodiment of the present inventive concepts, a method for operating a display device, having a display panel configured to display an image and a biometric sensor module configured to sense biometric information, includes determining an operation mode comprising a fingerprint sensing mode or a skin measuring mode. The biometric sensor module is controlled to output a first transmission signal having a first frequency when the operation mode is determined to be the fingerprint sensing mode. The biometric sensor module is controlled to output a second transmission signal having a second frequency that is different from the first frequency when the operation mode is determined to be the skin measuring mode.

In an exemplary embodiment, the method may further include: receiving fingerprint information, when the operation mode is the fingerprint sensing mode; and receiving skin condition information, when the operation mode is the skin measuring mode.

In an exemplary embodiment, the biometric sensor module may be an ultrasonic sensor module, and the first frequency of the first transmission signal may be lower than the second frequency of the second transmission signal.

In an exemplary embodiment of the present inventive concepts, a display device includes a display panel configured to display an image. A biometric sensor module is disposed on the display panel. The biometric sensor module is configured to operate in a plurality of biometric sensor modes. Each biometric sensor mode is configured to determine a different type of biometric information of a user than the other of the plurality of biometric sensor modes. The biometric sensor module is also configured to output a transmission signal and receive a reflected transmission signal in each biometric sensor mode. The transmission signal in each biometric sensor mode has a predetermined frequency that is different from predetermined frequencies of transmission signals in each of the other of the plurality of biometric sensor modes. The biometric sensor module is also configured to generate receiving signals from the reflected transmission signal in each biometric sensor mode to determine the different types of biometric information in each of the plurality of biometric sensor modes.

BRIEF DESCRIPTION OF THE DRAWINGS

The accompanying drawings are included to provide a further understanding of the present inventive concepts, and are incorporated in and constitute a part of this specification. The drawings illustrate exemplary embodiments of the present inventive concepts and, together with the description, serve to explain principles of the present inventive concepts. In the drawings.

DETAILED DESCRIPTION OF EXEMPLARY EMBODIMENTS

Figure 1:
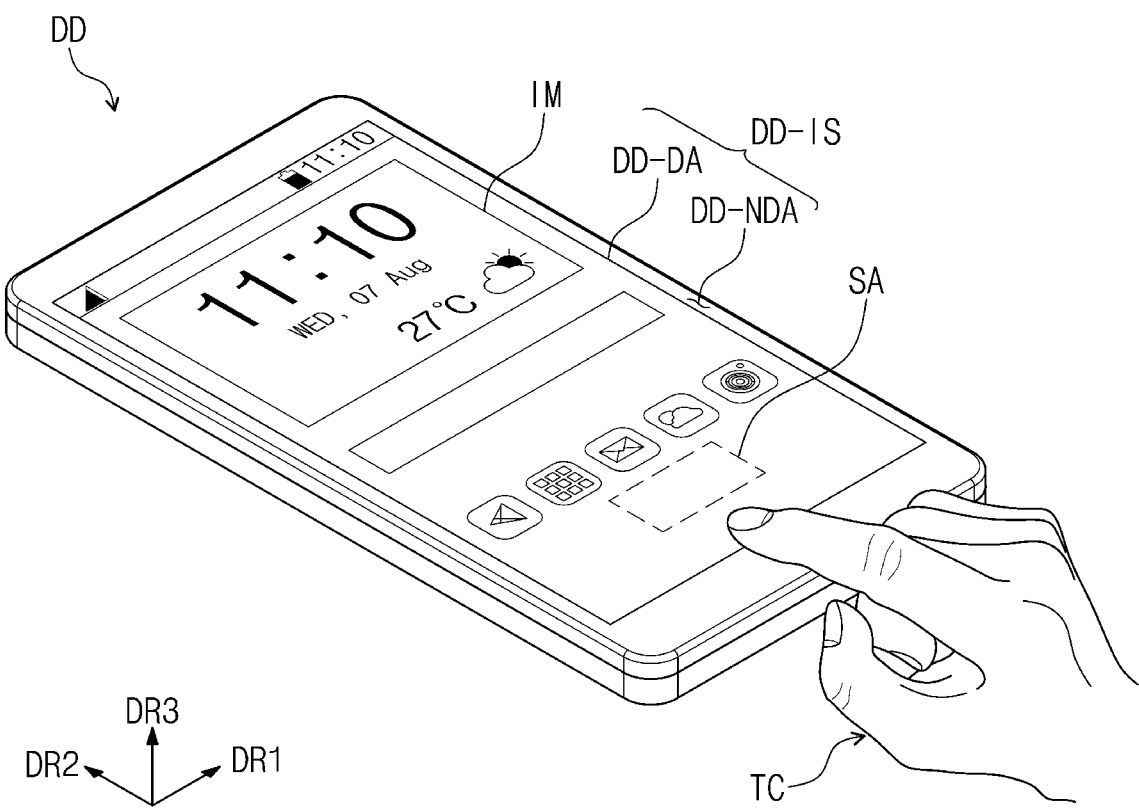
FIG. 1 is a perspective view of a display device according to an exemplary embodiment of the present inventive concepts.

It will be understood that when an element or layer is referred to as being "on", "connected to" or "coupled to" another element or layer, it can be directly on, connected or coupled to the other element or intervening third elements may be present. When an element or layer is referred to as being "directly on", "directly connected to" or "directly coupled to" another element or layer, no intervening elements may be present therebetween.

Like reference numerals in the drawings refer to like elements. In addition, in the drawings, the thickness and the ratio and the dimension of the element are exaggerated for effective description of the technical contents. The term "and/or" includes any and all combinations of one or more of the associated items.

Terms such as first, second, and the like may be used to describe various components. However, these components should not be limited by the terms. These terms are generally only used to distinguish one element from another. For instance, a first component may be referred to as a second component, or similarly, a second component may be referred to as a first component, without departing from the scope of the present disclosure. As used herein, the singular forms "a," "an," and "the" may be intended to include the plural forms as well, unless the context clearly indicates otherwise.

In addition, the terms such as "under", "lower", "on", and "upper" are used for explaining associations of items illustrated in the drawings. It will be understood that the spatially relative terms are intended to encompass different orientations of the device in use or operation in addition to the orientation depicted in the figures.

It will be further understood that the terms "includes" and/or "including", when used in this specification, specify the presence of stated features, integers, steps, operations, elements, components or combinations thereof, but do not preclude the presence or addition of one or more other features, integers, steps, operations, elements, components, or combinations thereof.

Unless otherwise defined, all terms (including technical and scientific terms) used herein have the same meaning as commonly understood by one of ordinary skilled in the art to which the exemplary embodiments belong. In addition, it will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, exemplary embodiments of the present inventive concepts will be described with reference to the accompanying drawings.

FIG. 1 is a perspective view of a display device DD according to an exemplary embodiment of the present inventive concepts.

As shown in the exemplary embodiment of FIG. 1, a display device DD may display an image IM on a display surface DD-IS. In the exemplary embodiment shown in FIG. 1, the display surface DD-IS is a surface having a plane defined by a first directional axis DR1 and a second directional axis DR2. The normal direction of the display surface DD-IS, namely, the thickness direction of the display device DD is indicated by a third directional axis DR3 which is perpendicular to the first directional axis DR1 and the second direction axis DR2.

A front surface (e.g., a top surface) and a rear surface (e.g., a bottom surface) of each member or each element to be described below are distinguished with respect to the third directional axis DR3. However, the first to third directional axes DR1, DR2, and DR3 shown in the exemplary embodiment of FIG. 1 are merely exemplary. Hereinafter, the first to third directions are directions respectively indicated by the first to third directional axes DR1, DR2, and DR3 and refer to identical reference numerals.

While the exemplary embodiment shown in FIG. 1 includes a display surface DD-IS that is planar (e.g., defined in the first direction and second direction DR1, DR2), exemplary embodiments of the present inventive concepts are not limited thereto. For example, in another exemplary embodiment, the display surface DD-IS of the display device DD may be curved. For example, in an exemplary embodiment, the display device DD may include a stereoscopic display surface DD-IS. The stereoscopic display surface includes a plurality of display areas indicating different directions, for example, a polygonal columnar display surface.

In an exemplary embodiment of the present inventive concepts, the display device DD may be a rigid display device. However, exemplary embodiments of the present inventive concepts are not limited thereto. For example, in another exemplary embodiment, the display device DD may be flexible display device. The flexible display device may include a foldable display device, which may be folded, or a bent display device of which a partial portion of the display device may be bent.

In the exemplary embodiment shown in FIG. 1, the display device DD is incorporated into a mobile phone. Electronic modules, camera modules, power supply modules, and the like mounted in a main board may be disposed in a bracket/case or the like together with the display device DD to form a smart phone or the like. However, exemplary embodiments of the present inventive concepts are not limited thereto and the display device may be incorporated into various different electronic devices. For example, in an exemplary embodiment, the display device DD may be applied to a large electronic device such as a television or a monitor, or a small or medium electronic device such as a tablet, a vehicle navigator, a game player or a smart watch.

As illustrated in the exemplary embodiment of FIG. 1, the display surface DD-IS includes an image area DD-DA on which the image IM is displayed, and a bezel area DD-NDA adjacent to the display area DD-DA. The bezel area DM-NDA is an area on which the image is not displayed.

As illustrated in FIG. 1, the image area DD-DA may have a substantially quadrangle shape. The "substantially quadrangle shape" includes not only a quadrangle shape in a mathematical meaning, but also a quadrangle shape in which vertexes are not defined in vertex areas (or corner areas) and curved boundaries are defined therein.

As shown in the exemplary embodiment of FIG. 1, the bezel area DD-NDA may surround the image area DD-DA (e.g., in the first direction DR1 and the second direction DR2). However, exemplary embodiments of the present inventive concepts are not limited thereto, and the shapes of the image area DD-DA and the bezel area DD-NDA may have various different shapes. In another exemplary embodiment, the bezel area DD-NDA may be not be disposed on all sides of the image area DD-DA. For example, the bezel area DD-NDA may be disposed on only one side of the image area DD-DA. In another exemplary embodiment, the bezel area DD-NDA may not be exposed externally due to the combined form of the display device DD and other components of the electronic device.

The display device DD according to an exemplary embodiment of the present inventive concepts may sense a user input TC applied from the outside. The user input TC may be one or a combination of external inputs of various types including a part of the user's body, light, heat or pressure, etc. The user input TC is described herein as a touch input by a user's finger that is applied to the front surface for convenience of explanation. However, this specific user input TC is exemplary, and, as described above, the user input TC may be various different inputs. In addition, while the user input TC is shown as being applied to the front surface of the display device DD, in other exemplary embodiments, the display device may be configured to sense a user input applied to a side surface or the rear surface of the display device DD. However, exemplary embodiments of the present inventive concepts are not limited thereto.

In addition, the display device DD according to an exemplary embodiment of the present inventive concepts may sense (e.g., detect or recognize) a fingerprint, which is one type of biometric information, from the user input TC applied from the outside.

In the exemplary embodiment shown in FIG. 1, the display device DD receives a user's fingerprint in a sensing area SA. In the exemplary embodiment shown in FIG. 1, the sensing area SA is a rectangular area on a lower portion (e.g., in the second direction DR2) of the image area DD-DA. However, the position, the size, and the shape of the sensing area SA is not limited to the exemplary embodiment shown in FIG. 1, and may be changed in various ways. In an exemplary embodiment, the sensing area SA may correspond to at least a portion of the image area DD-DA. For example, the shape, size and positioning of the sensing area SA may be the same as the entirety of the image area DD-DA of the display device DD. However, exemplary embodiments of the present inventive concepts are not limited thereto. In another exemplary embodiment, the sensing area SA may be disposed on a side surface or the rear surface of the display device DD.

Figure 2A:
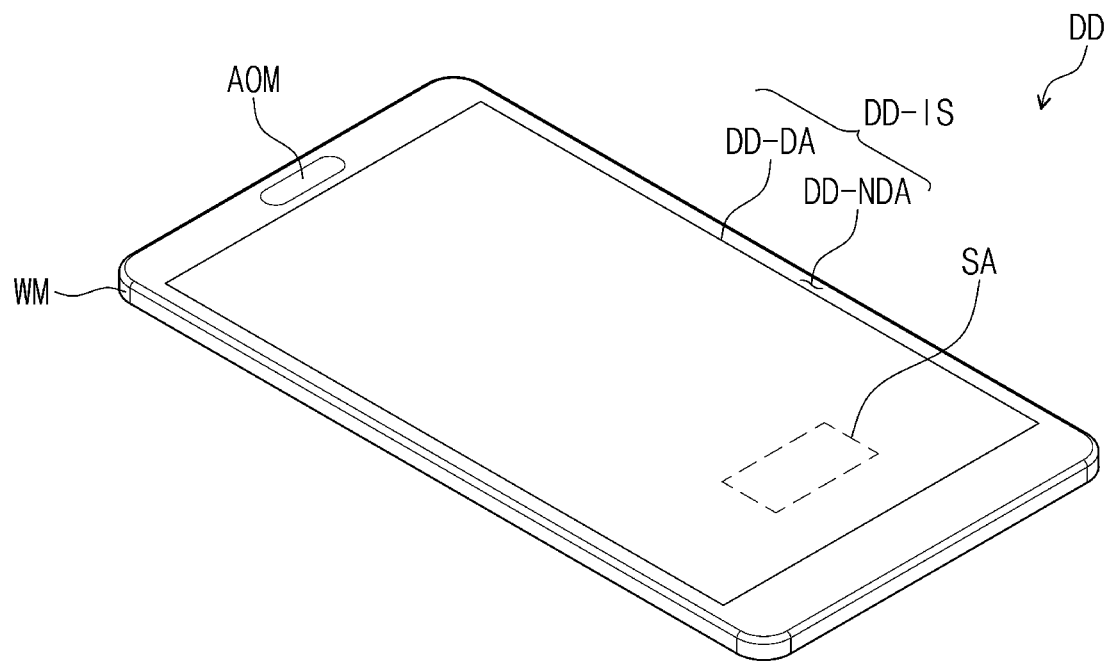
FIG. 2A is an exploded perspective view of a front surface of the display device according to an exemplary embodiment of the present inventive concepts.
Figure 2B:
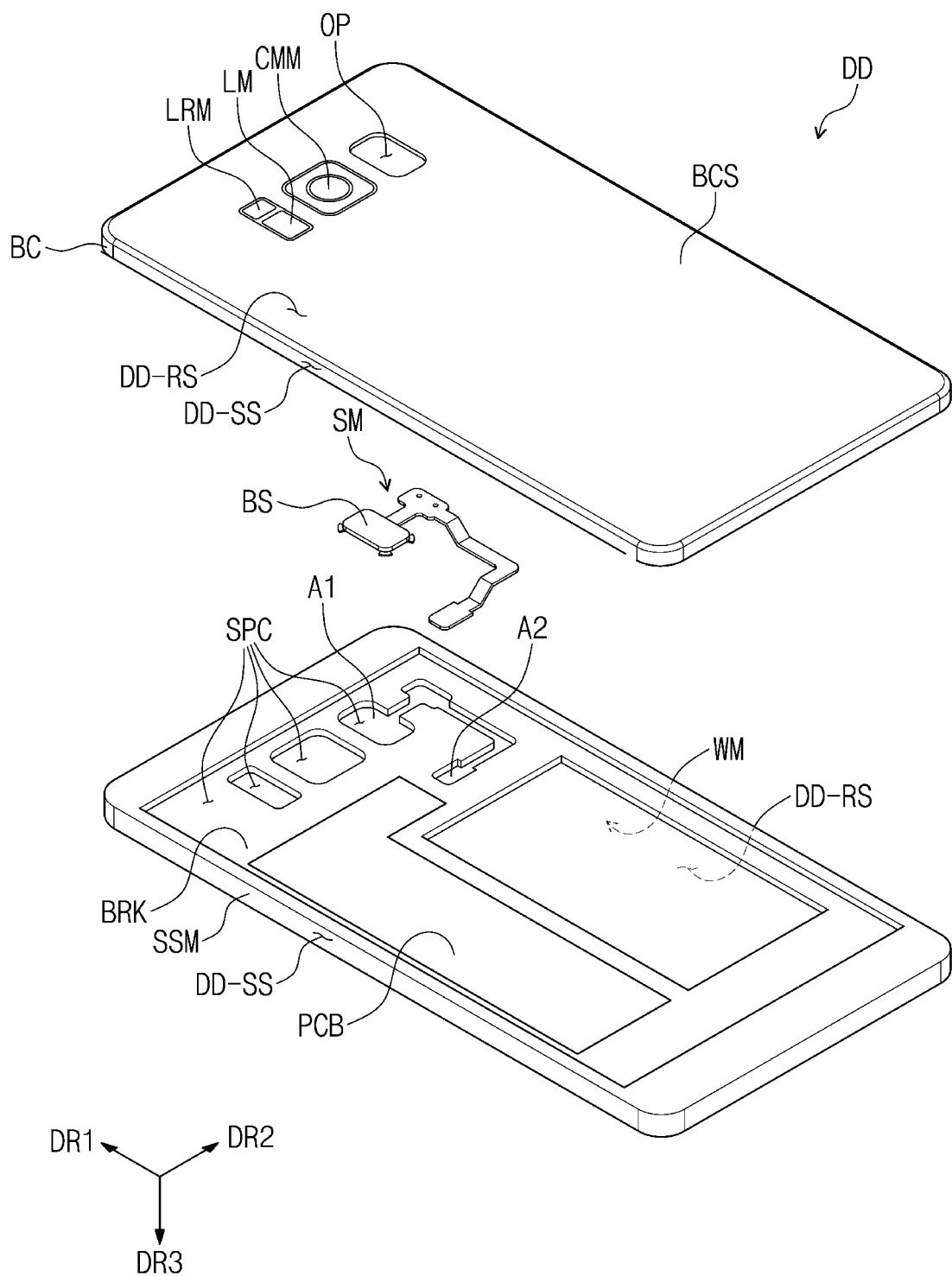
FIG. 2B is an exploded perspective view of a rear surface of the display device according to an exemplary embodiment of the present inventive concepts.

FIG. 2A is an exploded perspective view of a front surface of the display device DD according to an exemplary embodiment of the present inventive concepts. FIG. 2B is an exploded perspective view of a rear surface of the display device DD according to an exemplary embodiment of the present inventive concepts. Referring to FIGS. 2A and 2B, the display device DD may include the display surface DD-IS, the rear surface DD-RS (e.g., spaced apart from the display surface DD-IS in the third direction DR3), and a housing including side surfaces DD-RS enclosing spaces between the display surface DD-IS and the rear surface DD-RS. In another exemplary embodiment, the housing may refer to a structure forming a portion of the display surface DD-IS, the rear surface DD-RS, and the side surfaces DD-SS. As shown in the exemplary embodiment of FIG. 2A, the display surface DD-IS may be formed by a window WM which includes a surface having at least a portion that is substantially transparent. In an exemplary embodiment, the rear surface DD-RS may be formed with a substantially opaque bottom case BCS. In an exemplary embodiment, the rear surface DD-RS may be formed with coated or tinted glass, ceramic, a polymer, a metal (e.g., aluminum, stainless steel, or magnesium), or a combination of at least two among the above-described materials. However, exemplary embodiments of the present inventive concepts are not limited thereto. The side surface DD-SS may be combined with the display surface DD-IS and the rear surface DD-RS, and formed with a side surface member SSM including a metal and/or a polymer. However, exemplary embodiments of the present inventive concepts are not limited thereto. For example, in another exemplary embodiment, the bottom case BCS and the side surface member SSM may be formed as one body, and include an identical material (e.g., a metal material such as aluminum).

As shown in the exemplary embodiments of FIGS. 2A-2B, the display device DD may include an acoustic output module AOM, a light emitting module LM, a light receiving module LRM and a camera module CMM.

In the display device DD, a bracket BRK, a circuit board PCB, and a battery may be disposed in the space (e.g., in the third direction DR3) between the window WM and the bottom case BCS. In another exemplary embodiment, the display device DD may omit at least one among the components or include at least one additional component. Seating surfaces A1 and A2 in which the biometric sensor module SM is accommodated may be formed in spaces SPC formed on or within the bracket BRK. In an exemplary embodiment, the biometric sensor module SM may be an ultrasonic sensor module that transmits and receives an ultrasound signal.

As illustrated in FIG. 2A, the biometric sensor module SM may be disposed on the window WM so as to face the outside. The biometric sensor module SM includes a biometric sensor BS. The biometric sensor BS may be disposed at a position corresponding to the sensing area SA (e.g., overlapping the sensor area in the third direction DR3). In another exemplary embodiment, an opening may be formed in the window WM exposing at least a portion of the biometric sensor. For example, the opening may be formed in the bezel area DD-NDA.

Hereinafter, an exemplary embodiment will be explained in which the biometric sensor module SM is disposed to face the outside in the window WM of the display device DD. However, exemplary embodiments of the present inventive concepts are not limited thereto.

As illustrated in the exemplary embodiment of FIG. 2B, the display device DD may include the biometric sensor module SM disposed to face the outside in the rear surface DD-RS. The biometric sensor module SM includes a biometric sensor BS. The opening OP may be formed in the bottom case BCS. In an exemplary embodiment, the opening OP may have a shape corresponding to the shape of the biometric sensor BS. The seating surfaces A1 and A2 in the window member WM in which the biometric sensor module SM is accommodated may be formed in the bracket BRK.

Figure 3A:
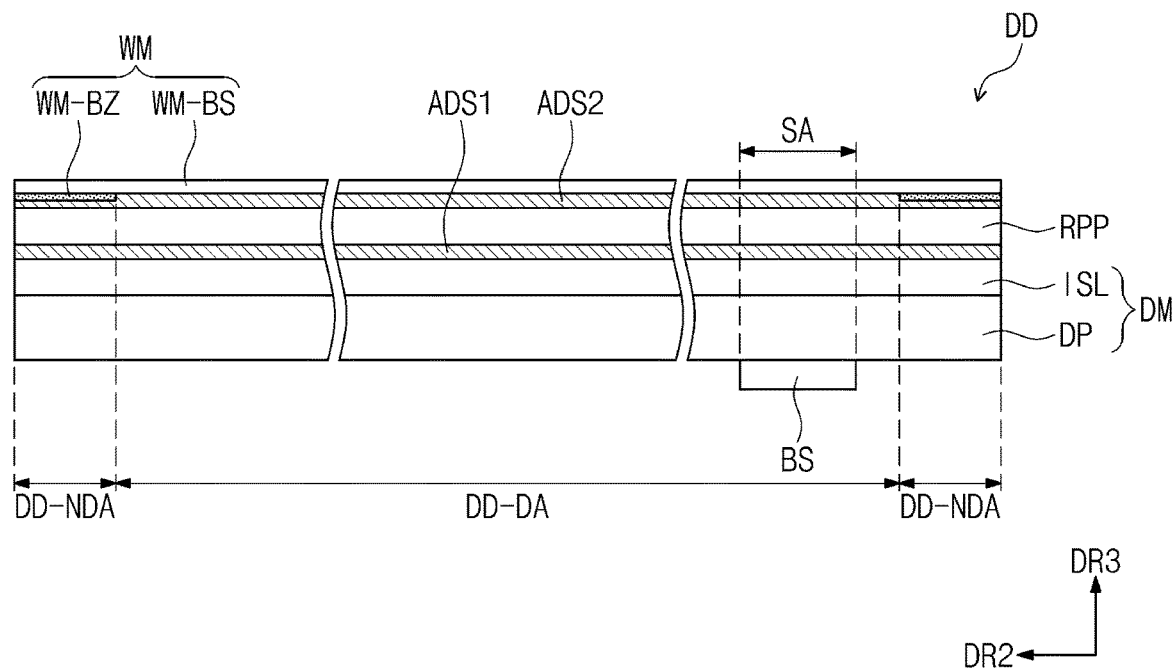
FIG. 3A is a cross-sectional view of a display device according to an exemplary embodiment of the present inventive concepts.
Figure 3B:
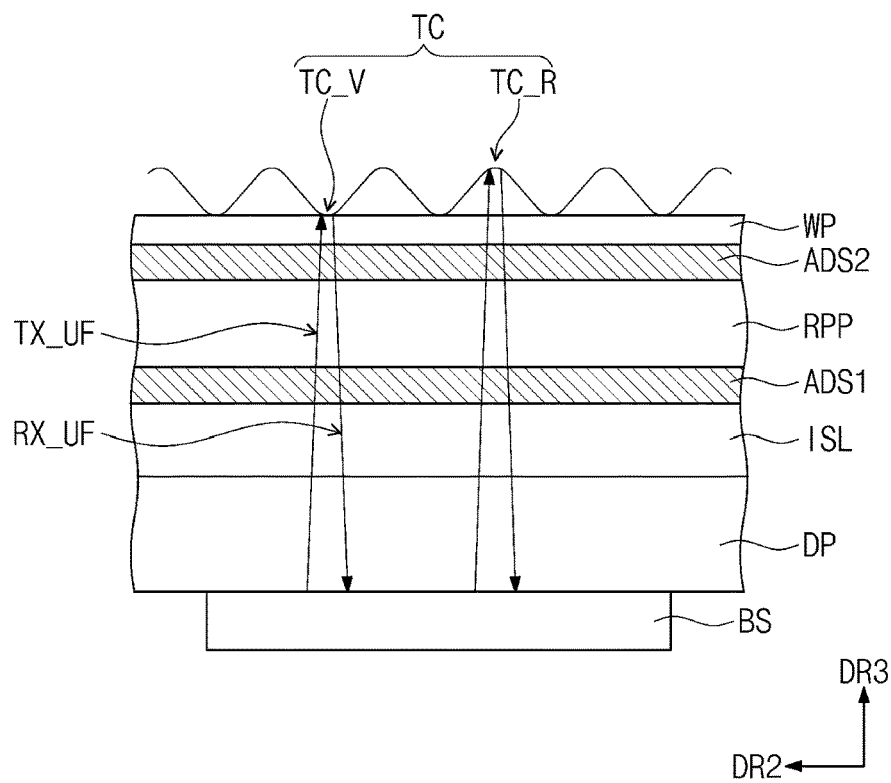
FIGS. 3B and 3C are enlarged cross-sectional views of portions of the display device illustrated in FIG. 3A detecting biometric information from a user input according to exemplary embodiments of the present inventive concepts.
Figure 3C:
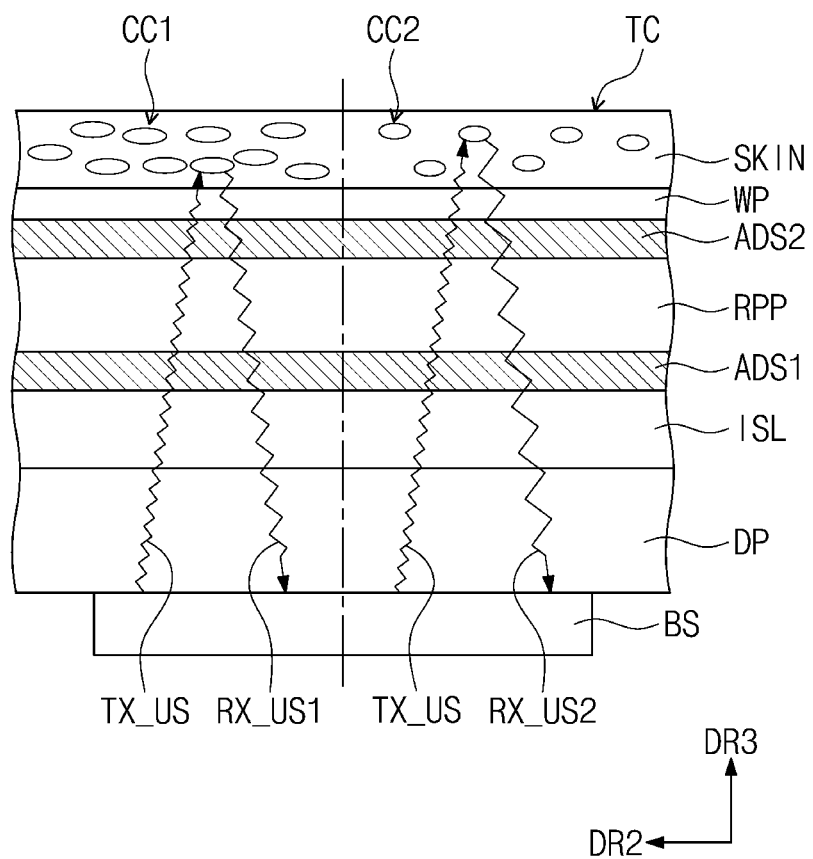

FIG. 3A is a cross-sectional view of the display device DD according to an exemplary embodiment of the present inventive concepts. FIGS. 3B and 3C are enlarged cross-sectional views of a portion of the display device illustrated in FIG. 3A.

FIGS. 3A, 3B and 3C illustrate cross sections defined by a second directional axis DR2 and a third directional axis DR3. In FIGS. 3A, 3B and 3C, components of the display device DD are simply illustrated to explain stacked relations thereof.

The display device DD according to an exemplary embodiment of the present inventive concepts may include a display module DM, an anti-reflector RPP, and a window WM. The display module DM includes a display panel DP and an input sensor ISL. At least some components among the display panel DP, the input sensor ISL, the anti-reflector RPP, and the window WM may be formed in consecutive processes, or may be combined through an adhesive member. For example, as shown in the exemplary embodiment of FIG. 3A, a bottom surface of the window WM may be disposed on a top surface of the anti-reflector RPP. A bottom surface of the anti-reflector RPP may be disposed on a top surface of the input sensor ISL. A bottom surface of the input sensor ISL may be disposed on a top surface of the display panel DP. However, exemplary embodiments of the present inventive concepts are not limited thereto. In an exemplary embodiment, the adhesive member ADS may be a transparent adhesive member such as a pressure sensitive adhesive film (PSA), an optically clear adhesive film (OCA), or an optically clear resin (OCR). The adhesive member to be described below may include a typical adhesive or a pressure sensitive adhesive. In an exemplary embodiment, the anti-reflector RPP and the window WM may be replaced with another component, or omitted.

As shown in the exemplary embodiment of FIG. 3A, among the input sensor ISL, the anti-reflector RPP, and the window WM, the input sensor ISL, which is formed through consecutive processes with the display panel DP may be directly disposed on the display panel DP. In the present specification, "a component B being directly disposed on a component A" means that there is not a separate adhesive layer/adhesive member between component A and component B. For example, component B is formed through consecutive processes on the base surface provided by component A, after component A is formed. As shown in the exemplary embodiment of FIG. 3A, the anti-reflector RPP and the window WM are a "panel type", and the input sensor ISL is a "layer type". The anti-reflector RPP and window WM include a first adhesive layer ADS1 and second adhesive layer ADS2, respectively, for attaching these panel type elements to the display device DD. The "panel type" includes a base layer that provides a base surface formed of, for example, a synthetic resin film, a composite material film, a glass substrate, or the like, but in the "layer type", the base layer may be omitted. In other words, components of the "layer type" are disposed on the base surface provided by another component. In an exemplary embodiment of the present inventive concepts, the anti-reflector and the window WM may be the "layer type".

As shown in the exemplary embodiment of FIG. 3A, the display module DM is formed with a single substrate, and each of the display panel DP and the input sensor ISL is formed with a layer(s). However, in another exemplary embodiment, the display panel PD and the input sensor ISL may be formed respectively with separate substrates and then combined.

The display panel DP generates an image, and the input sensor ISL acquires coordinate information of an external input (e.g., the user input TC). In an exemplary embodiment of the present inventive concepts, the display device DD may further include a protection member disposed on the bottom surface. The protection member and the display panel DP may be combined through an adhesive member.

As shown in the exemplary embodiment of FIG. 3A, the display device DD according to an exemplary embodiment of the present inventive concepts includes the input sensor ISL disposed on the top surface of the display panel DP. However, exemplary embodiments of the present inventive concepts are not limited thereto. For example, in another exemplary embodiment, the display device DD may not include the input sensor ISL.

The display panel DP according to an exemplary embodiment of the present inventive concepts may be a self-emitting display panel. However, exemplary embodiments of the present inventive concepts are not particularly limited thereto. For example, the display panel DP may be an organic light emitting display panel or a quantum dot light emitting display panel. The panels are distinguished according to a composition material of a light emitting element. A light emitting layer of the organic light emitting display panel includes an organic light emitting material. A light emitting layer of the quantum dot light emitting display panel may include a quantum dot, a quantum rod, or the like. Hereinafter, for convenience of explanation, the display panel DP is described as the organic light emitting display panel.

The anti-reflector RPP reduces a reflection ratio of external light incident from an upper side of the window WM. The anti-reflector RPP according to an exemplary embodiment of the present inventive concepts may include a phase retarder and a polarizer. The phase retarder may be a film type or a liquid crystal coating type, and include a λ/2 phase retarder and/or a λ/4 phase retarder. The polarizer may also be a film type or a liquid crystal coating type. The film type may include a stretchable synthetic resin film, and the liquid crystal coating type may include liquid crystals arranging in a prescribed array. The phase retarder and the polarizer may further include protection films. The phase retarder and the polarizer themselves or the protection film may be defined as a base layer of the anti-reflector RPP. However, exemplary embodiments of the present inventive concepts are not limited thereto.

The anti-reflector RPP according to an exemplary embodiment of the present inventive concepts may include color filters. The color filters have a prescribed array. The array of the color filters may be determined in consideration of light emission colors of pixels included in the display panel DP. The anti-reflector RPP may further include a black matrix adjacent to the color filters.

The anti-reflector RPP according to an exemplary embodiment of the present inventive concepts may include a destructive interference structure. For example, in an exemplary embodiment, the destructive interference structure may include a first reflection layer and a second reflection layer disposed on different layers. First reflection light and second reflection light reflected respectively by the first reflection layer and the second reflection layer may destructively interfere with each other, and thus an external light reflection ratio is reduced.

The window WM according to an exemplary embodiment of the present inventive concepts includes a base layer WM-BS and a light shielding pattern WM-BZ. The base layer WM-BS may include a glass substrate and/or a synthetic resin film, etc. The base layer WM-BS is not limited to a single layer. For example, the base layer WM-BS may include two or more films combined through an adhesive member.

The light shielding pattern WM-BZ overlaps the base layer WM-BS (e.g., in the third direction DR3) in the bezel area DD-NDA. The light shielding pattern WM-BZ is disposed on the rear surface of the base layer WM-BS, and the light shielding pattern WM-BZ may substantially define the bezel area DD-NDA of the display device DD. An area on which the light shielding pattern WM-BZ is not disposed may define the image area DD-DA of the display device DD. With respect to the window WM, an area in which the light shielding pattern WM-BZ is disposed is defined as a light shielding area of the window WM, and an area on which the light shielding pattern WM-BZ is not disposed is defined as a transmission area of the window WM.

In an exemplary embodiment, the light shielding pattern WM-BZ may have a multi-layered structure. The multi-layered structure may include a color layer of a chromatic color and a light shielding layer of an achromatic color (e.g., black). In an exemplary embodiment, the color layer of a chromatic color and the light shielding layer of an achromatic color may be formed through deposition, printing, and coating processes. Although not illustrated separately, the window WM may further include a functional coating layer disposed on the front surface of the base layer WM-BS (e.g., a top surface in the third direction DR3). In an exemplary embodiment, the functional coating layer may include at least one layer selected from a fingerprint prevention layer, an anti-reflection layer, a hard coating layer, etc.

A biometric sensor BS may be disposed on the bottom surface of the display panel DP. The biometric sensor BS is disposed at a position corresponding to the sensing area SA shown in FIG. 1. In an exemplary embodiment, the biometric sensor BS may be an ultrasonic sensor that transmits an ultrasonic transmission signal, which may penetrate the display panel DP, the input sensor ISL, the anti-reflector RPP, and the window WM, and may receive a feedback ultrasonic signal. However, exemplary embodiments of the present inventive concepts are not limited thereto and in other embodiments the biometric sensor may be another sensor other than an ultrasonic sensor.

The display device DD may operate in a fingerprint sensing mode for sensing a fingerprint from the user input TC. A fingerprint is one of numerous types of biometric information concerning the user. In an exemplary embodiment, the fingerprint sensing mode may be an operation mode for supporting a user authentication function such as for providing access to a secure connection, various kinds of financial payments, user registration, or the like. However, exemplary embodiments of the present inventive concepts are not limited thereto.

The display device DD may operate in a skin measuring mode for measuring various features of the skin of the user from the user input TC as another type of biometric information. For example, the skin measuring mode may be a beauty treatment mode for measuring a skin condition such as the skin elasticity, moisture, wrinkles, or the like. However, exemplary embodiments of the present inventive concepts are not limited thereto and the display device DD may measure other skin conditions of the user from the user input TC in the skin measuring mode.

The display device DD may operate as one of the fingerprint sensing mode and the skin measuring mode according to an operation mode selected by the user or as set by an application program. In addition, the biometric sensor BS may operate according to the set operation mode, namely, the fingerprint sensing mode and the skin measuring mode. However, exemplary embodiments of the present inventive concepts are not limited thereto. For example, in an exemplary embodiment, the display device DD may be configured to operate in a plurality of different modes for sensing different biometric information of the user from the user input TC. For example, the display device DD may be configured to operate in a fingerprint sensing mode and a plurality of skin measuring modes for measuring different skin conditions of the user.

FIG. 3B is a cross-sectional drawing for explaining an operation of the biometric sensor BS, when the display device DD operates in the fingerprint sensing mode according to an exemplary embodiment of the present inventive concepts.

Referring to the exemplary embodiment shown in FIG. 3B, the biometric sensor BS generates a first transmission signal TX_UF in the fingerprint sensing mode. In an exemplary embodiment, the first transmission signal TX_UF may be an ultrasonic signal having a frequency in a range of about 10 MHz to about 20 MHz that exceeds an audible range. However, the frequency of the first transmission signal TX_UF is not limited thereto, and the frequency of the ultrasonic signal may be selected within any frequency range in which a fingerprint of the user input TC may be sensed.

The first transmission signal TX_UF may be reflected by ridges TC_R and valleys TC_V of the fingerprint of the user input TC, and delivered to the biometric sensor BS as first receiving signals RX_UF. The biometric sensor BS may be configured to sense the difference between reflection characteristics of the ridges TC_R and the valleys TC_V of the fingerprint from the first receiving signals RX_UF, and may recognize the shape of the fingerprint from the detected reflection characteristics in the first receiving signal RX_UF.

FIG. 3C is a cross-sectional drawing for explaining an operation of the biometric sensor BS, when the display device DD operates in the skin measuring mode according to an exemplary embodiment of the present inventive concepts.

Referring to FIG. 3C, the biometric sensor BS generates a second transmission signal TX_US in the skin measuring mode. In an exemplary embodiment, the second transmission signal TX_US may be an ultrasonic signal having a frequency in a range of about 10 kHz to about 50 kHz that exceeds the audible range. However, the frequency of the second transmission signal TX_US is not limited thereto, and may be any frequency within a frequency range in which a skin condition is sensed from the user input TC. For example, the second transmission signal TX_US may be set to have a frequency that may be delivered to a dermal layer. In an exemplary embodiment, the second transmission signal TX_US may differ based on the specific skin condition to be sensed. In an exemplary embodiment, the frequency of the second transmission signal TX_US through which the skin condition is sensed from the user input TC is higher than the frequency of the first transmission signal TX_UF (see FIG. 3B) for sensing the fingerprint.

The second transmission signal TX_US may be reflected by cells CC1 and CC2 in the skin of the user input TC and delivered to the biometric sensor BS as second receiving signals RX_US1 and RX_US2. The biometric sensor BS may be configured to sense the difference between reflection characteristics based on the degree of the density of the cells from the second receiving signals RX_US1 and RX_US2, and to sense the skin condition.

Figure 4:
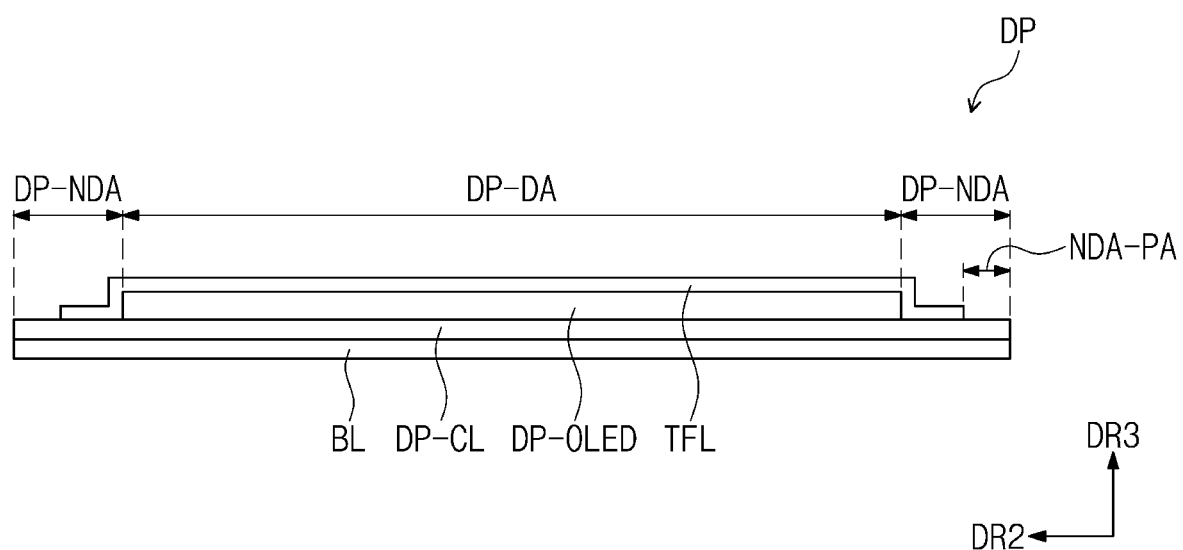
FIG. 4 is a cross-sectional view of a display panel according to an exemplary embodiment of the present inventive concepts.

FIG. 4 is a cross-sectional view of the display panel DP according to an exemplary embodiment of the present inventive concepts.

As illustrated in the exemplary embodiment of FIG. 4, the display panel DP includes a base layer BL, a circuit element layer DP-CL disposed on the base layer BL, a display element layer DP-OLED disposed on the circuit element layer DP-CL, and an upper insulation layer TFL disposed on the display element layer DP-OLED. The display area DP-DA and the non-display area DP-NDA, which correspond to the image area DD-DA and the bezel area DD-NDA shown in FIG. 1, may be defined on the display panel DP. In the present specification, "a region/part corresponds to a region/part" means "overlap each other" (e.g., in the third direction DR3), but is not limited to having an identical area and/or an identical shape.

The base layer BL may include at least one synthetic resin film. For example, in an exemplary embodiment, the base layer BL may include a glass substrate, a metal substrate, or an organic/inorganic composite material substrate, etc. However, exemplary embodiments of the present inventive concepts are not limited thereto.

The circuit element layer DP-CL includes at least one insulation layer and a circuit element. The insulation layer includes at least one organic layer and at least one inorganic layer. The circuit element includes signal lines and a pixel driving circuit, etc.

The display element layer DP-OLED includes at least organic light emitting diodes as light emitting elements. The display element layer DP-OLED may further include an organic layer such as a pixel definition layer.

The upper insulation layer TFL includes a plurality of thin films. In an exemplary embodiment, some of the thin films are disposed to enhance an optical efficiency, and some of the thin films are disposed to protect the organic light emitting diodes. A detailed description about the upper insulation layer TFL will be provided later.

Figure 5:
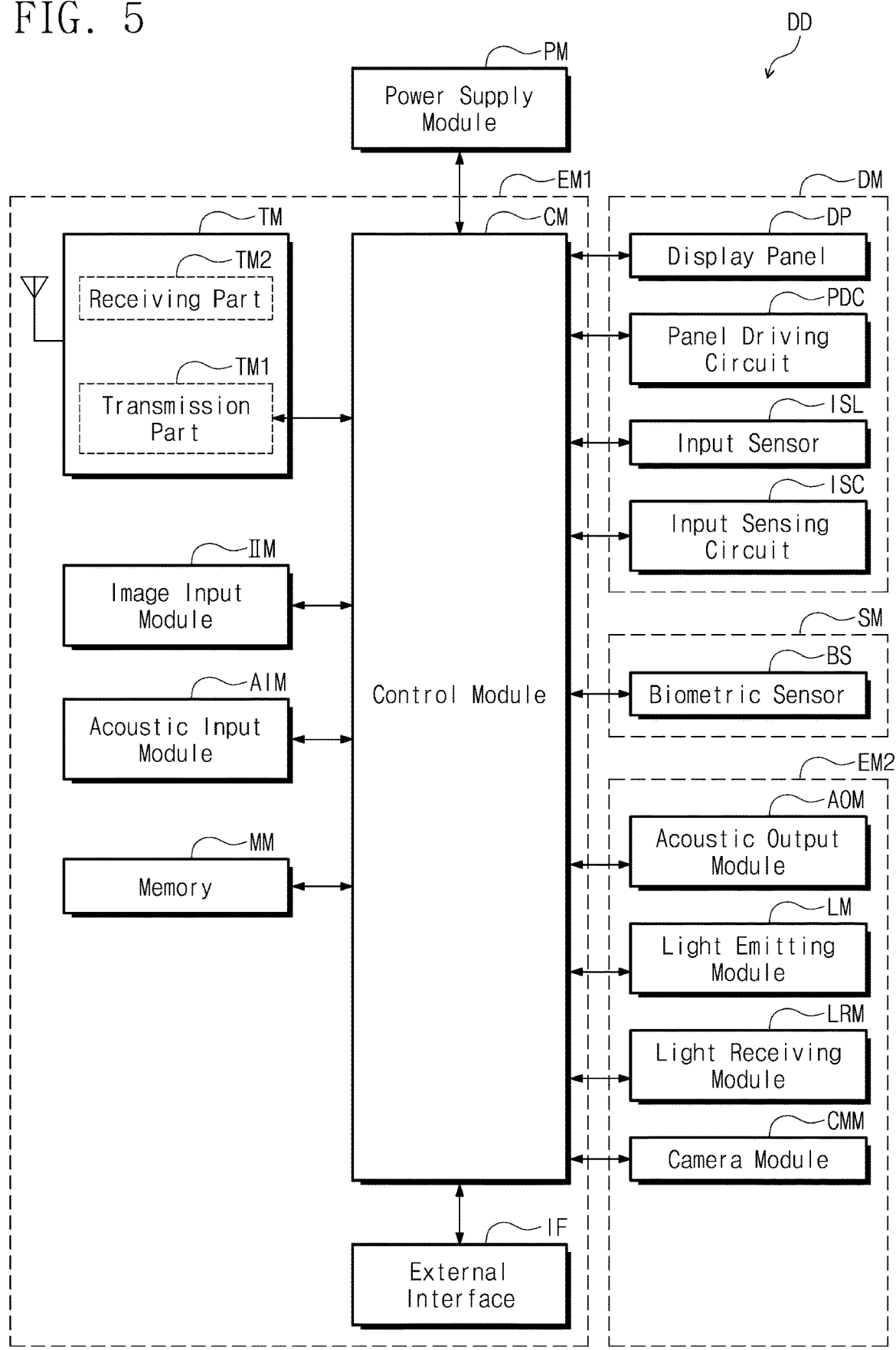
FIG. 5 is a block diagram of the display device shown in FIG. 1 according to an exemplary embodiment of the present inventive concepts.

FIG. 5 is a block diagram of the display device DD illustrated in FIG. 1 according to an exemplary embodiment of the present inventive concepts.

Referring to the exemplary embodiment of FIG. 5, the display device DD may include a display module DM, a biometric sensor module SM, a power supply module PM, a first electronic module EM1, and a second electronic module EM2. The display module DM, the biometric sensor module SM, the power supply module DM, the first electronic module EM1, and the second electronic module EM2 may be electrically connected to each other.

The display module DM shown in the exemplary embodiment of FIG. 5 may include the display panel DP and the input sensor ISL shown in FIG. 3A. In addition, the display module DM may further include a panel driving circuit PDC, and an input sensing circuit ISC.

The biometric sensor module SM includes a biometric sensor BS, a fingerprint readout circuit, and a skin measurement circuit. The biometric sensor BS may include a plurality of ultrasonic sensing pixels for sensing fingerprint information and skin information about a user.

The power supply module PM supplies power necessary for the entire operation of the display device DD. The power supply module PM may include a typical battery module.

The first electronic module EM1 and the second electronic module EM2 include various functional modules for operating the display device DD. In an exemplary embodiment, the first electronic module EM1 may be directly mounted on a mother board electrically connected to the display module DM or may be mounted on a separate board to be electrically connected to the mother board through a connector.

The first electronic module EM1 may include a control module CM, a wireless communication module TM, an image input module IIM, and an acoustic input module AIM, a memory MM, and an external interface IF. In an exemplary embodiment, some of the above modules may not be mounted on the mother board, but may be electrically connected to the mother board through a flexible circuit board.

The control module CM controls the entire operation of the display device DD. The control module CM may be a microprocessor. For example, the control module CM may activate or deactivate the display module DM. In an exemplary embodiment, the control module CM may control other modules such as the image input module IIM and/or the acoustic input module AIM on the basis of a touch signal received from the display module DM. In an exemplary embodiment, the control module CM may perform user authentication on the basis of a signal received from the biometric sensor module SM in the fingerprint sensing mode. The control module CM may also diagnose and/or determine the skin condition of the user on the basis of the signal received from the biometric sensor module SM in the skin measuring mode.

The wireless communication module TM may transmit/receive a wireless signal to/from another terminal, such as by using Bluetooth or WiFi. For example, the wireless communication module TM may transmit/receive a voice signal to/from a relay using a communication line. The wireless communication module TM includes a transmission part TM1 for modulating a signal to be transmitted and transmitting the modulated signal, and a receiving part TM2 for demodulating a received signal.

The image input module IIM processes an image signal and converts the processed signal into image data that may be displayed on the display module DM. The acoustic input module AIM receives external acoustic signals through a microphone in a recording mode, or a voice recognition mode, and converts the received acoustic signal into electrical voice data.

The external interface IF may be an interface connected to at least one of an external charger, a wired/wireless data port, or a card socket (e.g., memory card or SIM/UIM card), etc.

The second electronic module EM2 may include a sound output module AOM, a light emitting module LM, a light receiving module LRM and a camera module CMM, etc. The components may be directly mounted on a mother board, mounted on a separate board and electrically connected to the display module DM through a connector, or electrically connected to the first electronic module EM1.

The acoustic output module AOM may perform conversion on acoustic data received from the wireless communication module TM, or on acoustic data stored in the memory MM. The acoustic output module AOM may output the converted acoustic data to the outside.

The light emitting module LM generates and outputs light. In an exemplary embodiment, the light emitting module LM may output an infrared ray. The light emitting module LM may include an LED element. The light receiving module LRM may sense the infrared ray. The light receiving module LRM may be activated when the infrared ray of a prescribed level or higher is sensed. In an exemplary embodiment, the light receiving module LRM may include a CMOS sensor. However, exemplary embodiments of the present inventive concepts are not limited thereto. After the generated infrared ray is output from the light emitting module LM, the infrared ray may be reflected by an external object (e.g., the user's finger or the user's face), and the reflected infrared ray may be incident to the light receiving module LRM. The camera module CMM captures an external image.

Figure 6:
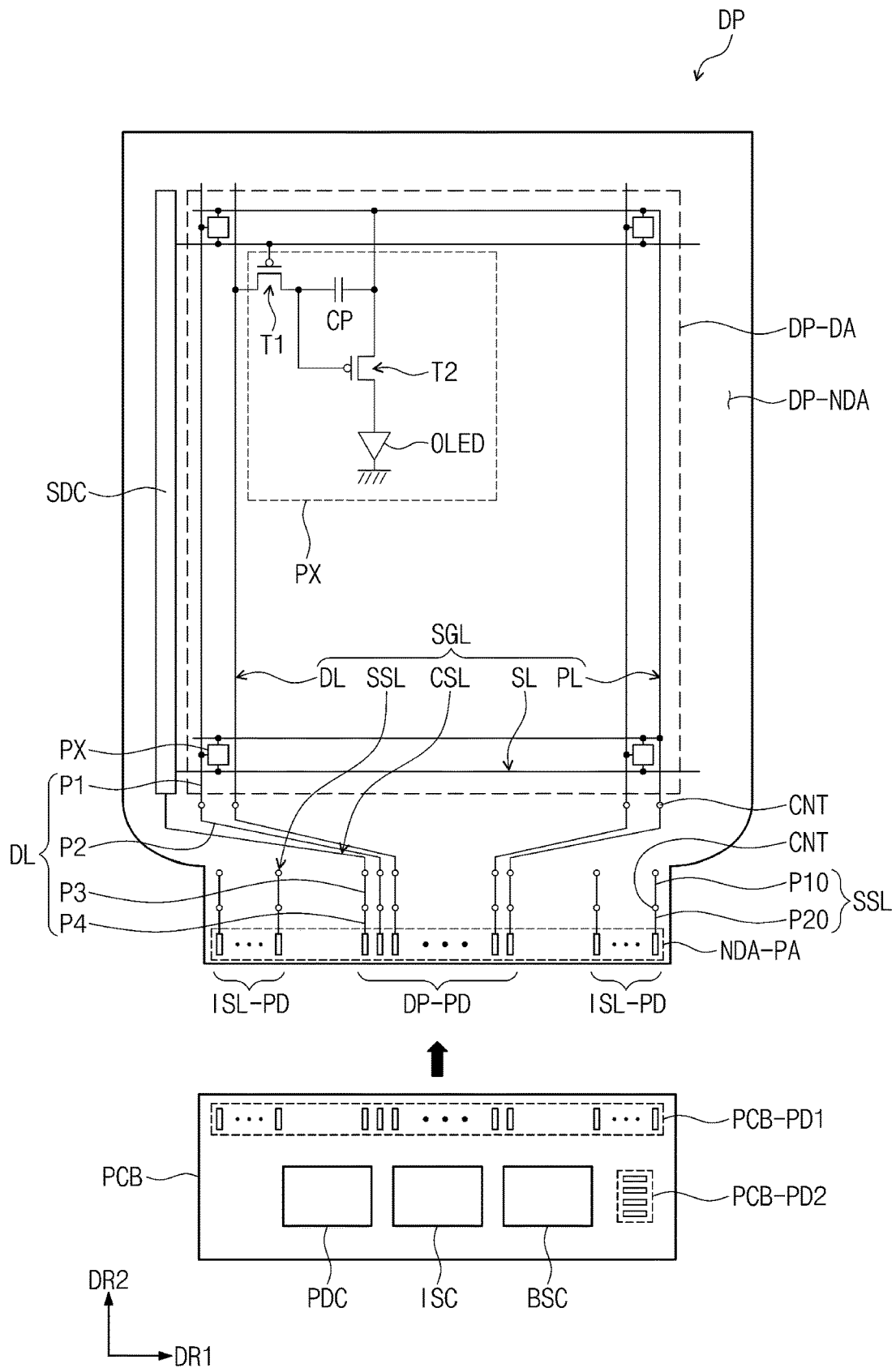
FIG. 6 is a plan view of a display panel according to an exemplary embodiment of the present inventive concepts

FIG. 6 is a plan view of a display panel DP according to an exemplary embodiment of the present inventive concepts.

As illustrated in the exemplary embodiment of FIG. 6, the display panel DP may include a driving circuit SDC, a plurality of signal lines SGL (hereinafter, signal lines), a plurality of signal pads, such as a first type of signal pads DP-PD connected to data lines DL, power lines PL, and control signal lines CSL, and a second type of signal pads ISL-PD connected to auxiliary lines SSL. DP-PD and ISL-PD (hereinafter, signal pads), and a plurality of pixels PX (hereinafter pixels).

The driving circuit SDC may include a scan driving circuit. The scan driving circuit generates a plurality of scan signals (hereinafter, scan signals), and sequentially outputs the scan signals to a plurality of scan lines SL (hereinafter, scan lines). The scan driving circuit may further output another control signal to the driving circuit of the pixels PX.

The scan driving circuit may include a plurality of transistors formed through the same processes as the driving circuit of the pixels PX. In an exemplary embodiment, the transistors may be formed by a low temperature polycrystalline silicon (LTPS) process, or a low temperature polycrystalline oxide (LTPO) process. However, exemplary embodiments of the present inventive concepts are not limited thereto.

The signal lines SGL include scan lines SL, data lines DL, a power line PL, and a control signal line CSL. Each of the scan lines SL and each of the data lines DL is connected to a corresponding pixel among the pixels. The power line PL is connected to the pixels PX. The control line CSL may provide control signals to the scan driving circuit.

As shown in the exemplary embodiment of FIG. 6, the signal lines SGL may further include auxiliary lines. The auxiliary lines SSL are signal lines connected to the input sensor ISL (see FIG. 3A). However, exemplary embodiments of the present inventive concepts are not limited thereto and in another exemplary embodiment of the present inventive concepts, the auxiliary lines SSL may be omitted.

The signal lines SGL may include a plurality of parts disposed on different layers. FIG. 6 exemplarily illustrates data lines DL including four parts P1 to P4 and auxiliary lines SSL including two parts P10 and P20. The four parts P1 to P4 may be connected through contact holes CNT, and the two parts P10 and P20 may be connected through contact holes CNT. A first part P10 of the auxiliary lines SSL is connected, through the contact holes CNT, to a signal line of the input sensor ISL, see FIG. 7) to be described later.

The signal pads may include the first type signal pads DP-PD connected to the data lines DL, the power lines PL, and the control signal lines CSL, and include the second type signal pads ISL-PD connected to the auxiliary lines SSL.

The first type signal pads DP-PD and the second type signal pads ISL-PD may be disposed adjacent to a pad area NDA-PA defined in a portion of the non-display area DP-NDA. In an exemplary embodiment, the layered-structures or composition materials of the signal pads DP-PD and ISL-PD are not distinguished from each other, and may be formed through identical processes.

The display area DP-DA may be defined as an area in which the pixels are disposed. A plurality of electronic elements are disposed in the display area DP-DA. The electronic elements include organic light emitting diodes respectively provided in the pixels PX and a pixel driving circuit connected thereto. As shown in the exemplary embodiment of FIG. 3A, the driving circuit SDC, the signal lines SGL, the signal pads DP-PD and ISL-PD, and the pixel driving circuit may be included in the circuit element layer DL-CL.

In an exemplary embodiment, the pixel PX may include a first transistor T1, a second transistor T2, a capacitor CP, and an organic light emitting diode OLED. While the pixel driving circuit shown in FIG. 6 solely includes the first transistor T1 and the second transistor T2, exemplary embodiments of the present inventive concepts are not limited thereto. In other exemplary embodiments, the pixel driving circuit may include various different numbers of transistors. The first transistor T1 is connected to the scan line SL and the data line DL. The organic light emitting diode OLED receives a power supply voltage provided through the power line PL.

A panel driving circuit PDC for controlling an operation of the display panel DP may be disposed in the circuit board PCB. In addition, an input sensing circuit ISC for controlling the input sensor ISL and a biometric sensor control circuit BSC may disposed in the circuit board PCB. In an exemplary embodiment, each of the panel driving circuit PDC, the input sensing circuit ISC, and the biometric sensor control circuit BSC may be respectively mounted in the circuit board in integrated chip types. In another exemplary embodiment of the present inventive concepts, the panel driving circuit PDC, the input sensing circuit ISC, and the biometric sensor control circuit BSC may be mounted in the circuit board PCB in one integrated chip. The circuit board PCB may include first circuit board pads PCB-PD electrically connected to the signal pads DP-PD and ISL-PD. The circuit board PCB may further include signal lines for connecting the first circuit board pads PCB-PD1, the panel driving circuit PDC, and/or the input sensing circuit ISC. In addition, the first circuit board pads PCB-PD1 may include at least one output pad and at least one input pad.

In an exemplary embodiment, the signal pads DP-PD and ISL-PD of the display panel DP, and the first circuit board pads PCB-PD1 may be directly connected. In another exemplary embodiment, the signal pads DP-PD and ISL-PD, and the circuit board pads PCB-D1 may be electrically connected through a connection board such as an anisotropic conductive film.

In another exemplary embodiment, the panel driving circuit PDC may not be mounted in the circuit board PCB, but may be mounted in the non-display area DP-NDA of the display panel DP.

The circuit board PCB may further include second circuit board pads PCB-PD2 electrically connected to sensor pads BS-PD of a biometric sensor module SM (see FIG. 8) to be described later.

The sensor pads BS-PD of the biometric sensor module SM and the circuit board pads PCB-PD2 may be directly connected. In another exemplary embodiment, the sensor pads BS-PD and the circuit board pads PCB-PD2 may be electrically connected through a connection board such as an isotropic conductive film.

The biometric sensor control circuit BSC transmits signals for controlling an operation of the biometric sensor module SM through the second circuit board pads PCB-PD2. The biometric sensor control circuit BSC may generate a fingerprint signal according to a signal received from the biometric sensor module SM in the fingerprint sensing mode. In addition, the biometric sensor control circuit BSC may generate a skin measurement signal according to a signal received from the biometric sensor module SM in the skin measuring mode.

A portion of the display panel DP illustrated in FIG. 6 may be bent. For example, in an exemplary embodiment, a portion of the non-display area DP-NDA may be bent on the basis of a bending axis parallel to a first direction DR1. The bending axis may be defined to overlap second parts P2 of the data lines DL and the auxiliary lines SSL. However, exemplary embodiments of the present inventive concepts are not limited thereto.

Figure 7:
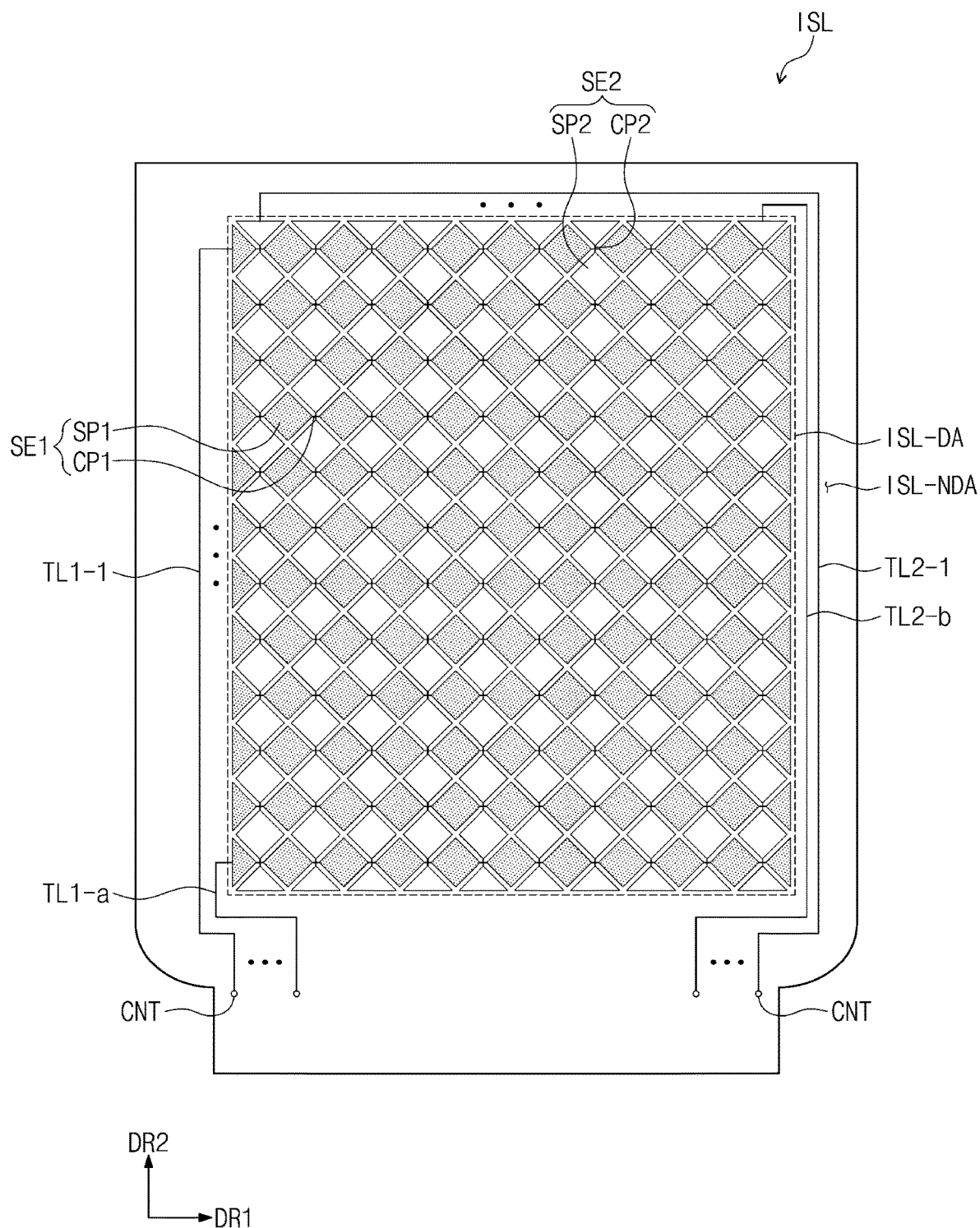
FIG. 7 is a plan view of an input sensor according to an exemplary embodiment of the present inventive concepts.

FIG. 7 is a plan view of the input sensor ISL according to an exemplary embodiment of the present inventive concepts.

Referring to the exemplary embodiment of FIG. 7, the input sensor ISL may be disposed on the display panel DP illustrated in FIG. 6. The input sensor ISL may sense the user input TC (see FIG. 1) to obtain the position and the intensity of an external touch input. The input sensor ISL may include a sensing area ISL-DA and a wiring area ISL-NDA on a plane (e.g., in the first direction DR1 and second direction DR2). The sensing area ISL-DA may be defined as an area in which first sensing electrodes SE1 and second sensing electrodes SE2 are disposed. In the exemplary embodiment shown in FIG. 7, the wiring area ISL-NDA may be defined along the edge of the sensing area ISL-DA. The sensing area ISL-DA and the wiring area ISL-NDA may correspond respectively to the display area DP-DA and the non-display area DP-NDA of the display panel DP illustrated in FIG. 6.

In an exemplary embodiment, the input sensor ISL may be a capacitive touch sensor. Any one of the first sensing electrodes SE1 and the second sensing electrodes SE2 receive a driving signal, and the other of the first sensing electrodes SE1 and the second sensing electrodes SE2 output a capacity change amount between the first sensing electrodes SE1 and the second sensing electrodes SE2 as a sensing signal.

As shown in the exemplary embodiment of FIG. 7, each of the first sensing electrodes SE1 has a shape extending in the first direction DR1. In addition, the first sensing electrodes SE1 may be arranged in a second direction DR2 to be sequentially disposed. The first sensing electrodes SE1 may include a plurality of first sensing patterns SP1 and a plurality of first connection patterns CP1.

As shown in the exemplary embodiment of FIG. 7, each of the second sensing electrodes SE2 has a shape extending in the second direction DR2. In addition, the second sensing electrodes SE2 may be arranged in the first direction DR1 to be sequentially disposed. The second sensing electrodes SE2 may include a plurality of second sensing patterns SP2 and a plurality of second connection patterns CP2.

First sensing lines TL1-1 to TL1-$a$ may include the same number of signal lines as the first sensing electrodes SE1. The first sensing lines TL1-1 to TL1-$a$ may be connected to at least one of both terminals of the first sensing electrodes SEL. Second sensing lines TL2-1 to TL2-$b$ may include the same number of signal lines as the second sensing electrodes SE2. The second sensing lines TL2-1 to TL2-*b* may be connected to at least one of both terminals of the second sensing electrodes SE2.

The first sensing lines TL1-1 to TL1-*a* may be connected to a part of the auxiliary lines SSL (see FIG. 6) disposed on one side of the pad area NDA-PA, such as a first lateral side in the first direction DR1 (see FIG. 6) through the contact holes CNT. The second sensing lines TL2-1 to TL2-*b* may be connected to a pan of the auxiliary lines SSL (see FIG. 6) disposed on another side of the pad area NDA-PA (see FIG. 6), such as a second lateral side in the first direction DR1 through the contact holes CNT.

The contact holes CNT penetrate insulation layers disposed between the auxiliary lines SSL, and the first sensing lines TL1-1 to TL1-*a* and the second sensing lines TL2-*a* to TL2-*b*.

Figure 8:
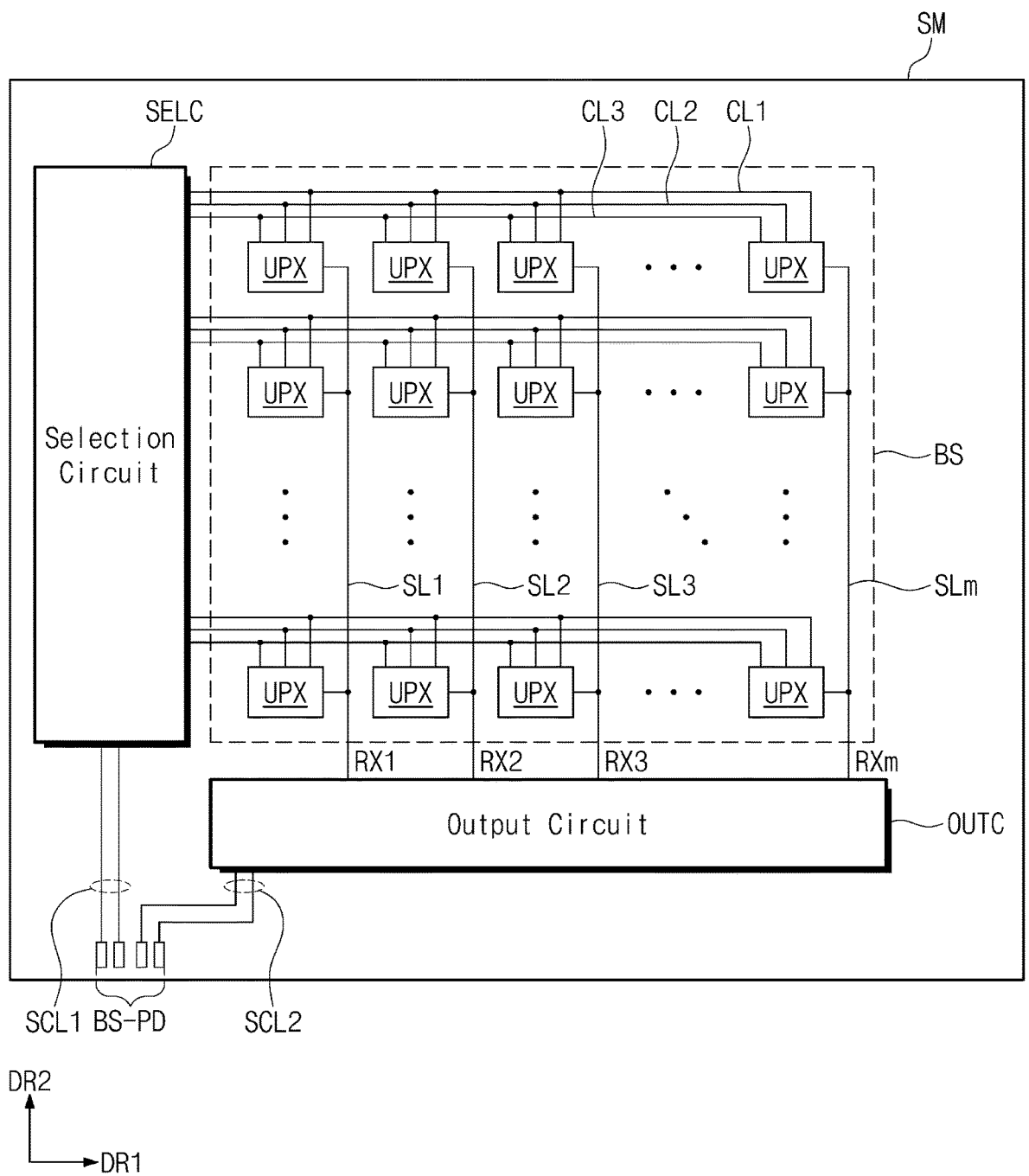
FIG. 8 shows a block diagram of a biometric sensor module according to an exemplary embodiment of the present inventive concepts.

FIG. 8 is an exemplary block diagram of the biometric sensor module SM according to an exemplary embodiment of the present inventive concepts.

Referring to the exemplary embodiment shown in FIG. 8, the biometric sensor module SM includes a biometric sensor BS, a selection circuit SELC, and an output circuit OUTC. The biometric sensor BS includes a plurality of detection sensors UPX. As shown in the exemplary embodiment of FIG. 8, the plurality of detection sensors UPX may be arranged in a matrix type array in which the detection sensors are arranged in a first direction DR1 and a second direction DR2. However, the size and arrangement of the detection sensors UPX are not limited to the exemplary embodiment shown in FIG. 8 and the size and an arrangement of the plurality of detection sensors UPX may be changed in various ways. For example, the sizes of some of the detection sensors UPX may be larger or smaller than others. In addition, the detection sensors UPX may be arranged alternately in a zigzag manner for each row or each column. In an exemplary embodiment, each of the plurality of detection sensors UPX may be an ultrasonic sensor.

Each of the plurality of detection sensors UPX outputs an ultrasonic signal, and receives a feedback ultrasonic signal reflected from the user's finger due to the user's touch TC (see FIG. 1).

The selection circuit SELC may output control signals for controlling the detection sensors UPX as first to third control lines CL1, CL2, and CL3 in response to control signals received through the sensor pads BS-PD of the biometric sensor module SM and the first sensing control lines SCL1 from the biometric sensor control circuit BSC (see FIG. 6).

The output circuit OUTC receives the biometric sensing signals sensed by the detection sensors UPX through the sensing lines SL1 to SLm. The output circuit OUTC may convert the received biometric sensing signals into the first receiving signals RX_UF (see FIG. 3B) or the second receiving signals RX_US (see FIG. 3C), and provide the converted signals to the biometric sensor control circuit BSC (see FIG. 6) through the second sensing control lines SCL2 and the sensor pads BS-PD.

Figure 9:
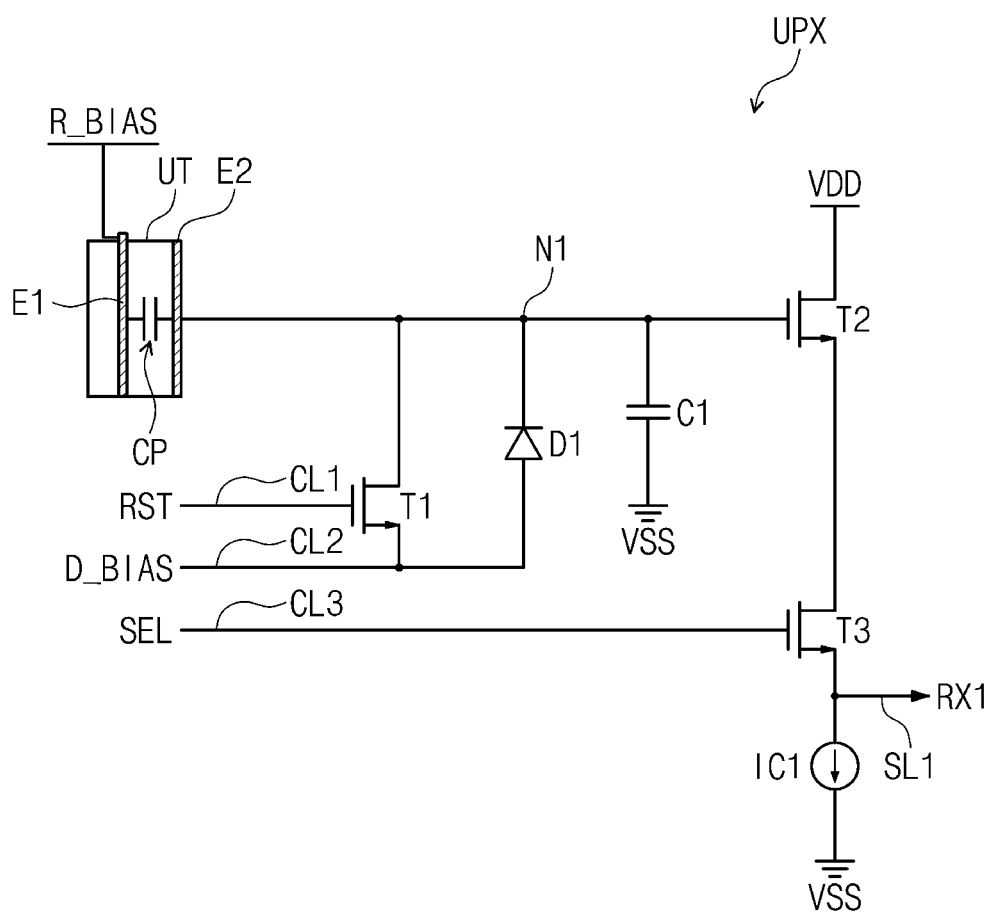
FIG. 9 illustrates an exemplary circuit configuration of a detection sensor illustrated in FIG. 8 according to an exemplary embodiment of the present inventive concepts.

FIG. 9 illustrates an exemplary circuit diagram showing a circuit configuration of any one among the detection sensors UPX illustrated in FIG. 8 according to an exemplary embodiment of the present inventive concepts.

Referring to the exemplary embodiment of FIG. 9, the detection sensor UPX is connected to the first to third control lines CL1, CL2 and CL3, and the biometric sensing line SL1. The detection sensor UPX includes an ultrasonic transducer UT, the first to third transistors T1, T2 and T3, a diode D1, a capacitor C1, and a current source IC1.

In an exemplary embodiment, the ultrasonic transducer UT may be a piezoelectric micromechanical ultrasonic transducer (PMUT). A piezoelectric layer stack may include piezoelectric material layers.

The ultrasonic transducer UT may be configured to operate in modes corresponding to a plurality of frequency ranges. For example, in some exemplary embodiments, the ultrasonic transducer UT may be configured to operate in the fingerprint sensing mode (or a high-frequency mode) corresponding to a first frequency (e.g., about 10 MHz to about 20 MHz) or at least one skin measuring mode (or a low-frequency mode) corresponding to a second frequency (e.g., about 10 kHz to about 50 kHz). The ultrasonic transducer UT may sense the fingerprint from the user input TC in the fingerprint sensing mode. In addition, the ultrasonic transducer UT may measure the skin condition from the user input TC in the skin measuring mode.

The operation frequency of the ultrasonic transducer UT is not limited to the above-described ranges, and may be changed in various ways if necessary. Furthermore, the ultrasonic transducer UR is not limited to the two modes including the fingerprint sensing mode and the skin measuring mode, and may generate ultrasonic signals of various frequencies in various different modes.

The ultrasonic transducer UT is disposed between a first electrode E1 and a second electrode E2, and may include a piezoelectric material layer (or a piezoelectric layer) disposed on one of an upper part and a lower part of the biometric sensor BS. The ultrasonic transducer UT may include a capacitor CP as a result of capacitance of the piezoelectric layer. For example, the capacitor CP may have the capacitance between a receiver bias electrode R_BIAS (or the first electrode E1) and the second electrode E2. The first electrode E1 of the transducer UT may be referred to as a lower electrode, and the second electrode E2 may be referred to as an upper electrode. The second electrode E2 of the ultrasonic transducer UT is connected to a first node N1.

In an exemplary embodiment, each of the first to third transistors T1, 12, and T3 may be an NMOS transistor. In another exemplary embodiment, at least one of the first to third transistors T1, T2, and T3 may be a PMOS transistor.

In an exemplary embodiment, the first transistor T1 may be a reset transistor for resetting a voltage level of the first node N1 to a diode bias voltage D_BIAS. The first transistor T1 includes a first terminal connected to the first node N1, a second terminal connected to the second control line CL2 through which the diode bias voltage D_BIAS is received, and agate terminal connected to the first control line CL1 through which a reset signal RST is received.

A diode D1 may be a P-N type diode. The diode D1 is connected between the first node N1 and the second control line CL2 through which the diode bias voltage D_BIAS is received. An anode of the diode D1 may be biased with the diode bias voltage D_BIAS.

The capacitor CP is connected between the first node N1 and a ground voltage terminal VSS.

The second transistor T2 includes a first terminal through which a power supply voltage VDD is received, a second terminal connected to a first terminal of the third transistor T3, and a gate terminal connected to the first node N1.

The third transistor T3 includes the first terminal connected to the second terminal of the second transistor T2, a second terminal connected to the current source IC1, and a gate terminal connected to the third control line CL3 through which the selection signal SEL is received. The second terminal of the third transistor T3 is also connected to the biometric sensing line SL1. In addition, a voltage of the biometric sensing line SL1 may be provided to the output circuit OUTC (see FIG. 8) as a receiving signal RX1.

The current source IC1 is connected between the second terminal of the third transistor T3 and a ground voltage terminal VSS.

Figure 10:
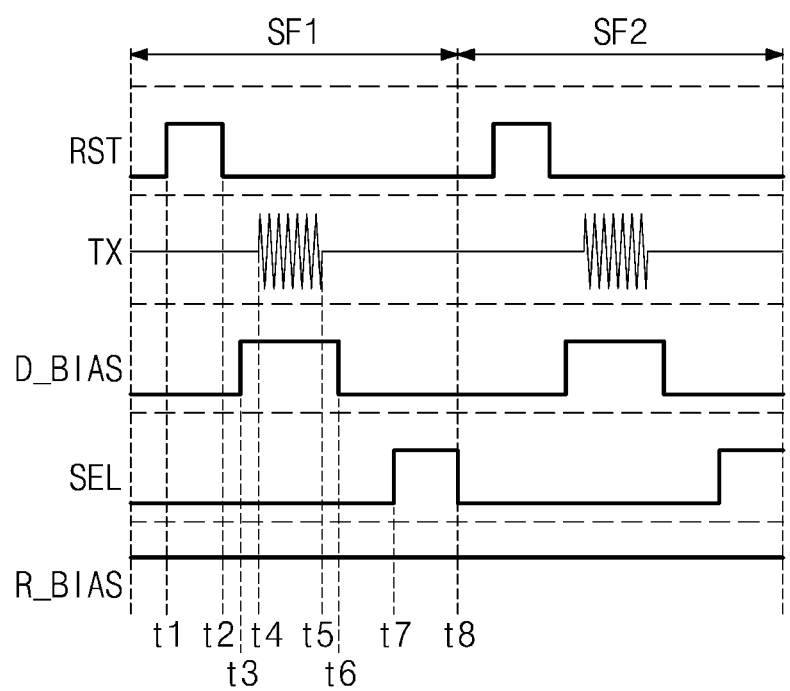
FIG. 10 is an exemplary timing diagram for explaining an operation of the detection sensor illustrated in FIG. 9 according to an exemplary embodiment of the present inventive concepts.

FIG. 10 is an exemplary timing diagram for explaining an operation of the detection sensor UPX illustrated in FIG. 9 according to an exemplary embodiment of the present inventive concepts.

Referring to FIGS. 9 and 10, when the reset signal RST is transitioned to an active level (e.g., a high level) at a first time t1 of a first sensing frame SF1, the first transistor T1 is turned on. As the first transistor T1 is turned on, the first node N1 may be reset to the diode bias voltage D_BIAS. Since the diode bias voltage D_BIAS has a non-active level (e.g., a low level or a ground voltage) when the first transistor T is turned on, the first node N1 may be reset to be a non-active level (e.g., a low level or a ground voltage level).

After the reset signal RST is transitioned from the active level to a non-active level (e.g., a low level) at a second time t2, when the diode bias voltage D_BIAS is transitioned to an active level (e.g., a high level or a power supply voltage level) at a third time t3, the ultrasonic transducer UT outputs a transmission signal TX between a fourth time t4 and a fifth time t5.

As described above, the ultrasonic transducer UT outputs the transmission signal TX corresponding to a first frequency in the fingerprint sensing mode, and outputs the transmission signal TX corresponding to a second frequency in the skin measuring mode. The first frequency may be a frequency in a range of about 10 MHz to about 20 MHz, and the second frequency may be a frequency in a rage of about 10 kHz to about 50 kHz. For example, the first frequency and the second frequency may be set to arbitrary frequencies within exemplified ranges, but the frequencies are not changed to different frequencies within the specified ranges during operation. For example, in an exemplary embodiment, the ultrasonic transducer UT may output the first transmission signal TX_UF of about 12 MHz in the fingerprint sensing mode, and output the second transmission signal TX_US of about 50 kHz in the skin measuring mode.

After the diode bias voltage D_BIAS is transitioned to a non-active level at a sixth time t6, the voltage level of the first node N1 is determined according to an ultrasonic receiving signal received by the ultrasonic transducer UT.

The second transistor T2 may be turned on/off according to the voltage level of the first node N1. When the selection signal SEL is transitioned to an active level (e.g., a high level) at a seventh time t7, the third transistor T3 is turned on and the received signal RX1 corresponding to the first node N1 is provided to the output circuit OUTC (see FIG. 8).

When the reset signal RST is transitioned again to the active level (e.g., the high level) in a second sensing frame SF2, the first node N1 may be reset to a non-active level (e.g., a low level or a ground voltage) of the diode bias voltage D_BIAS.

Figure 11:
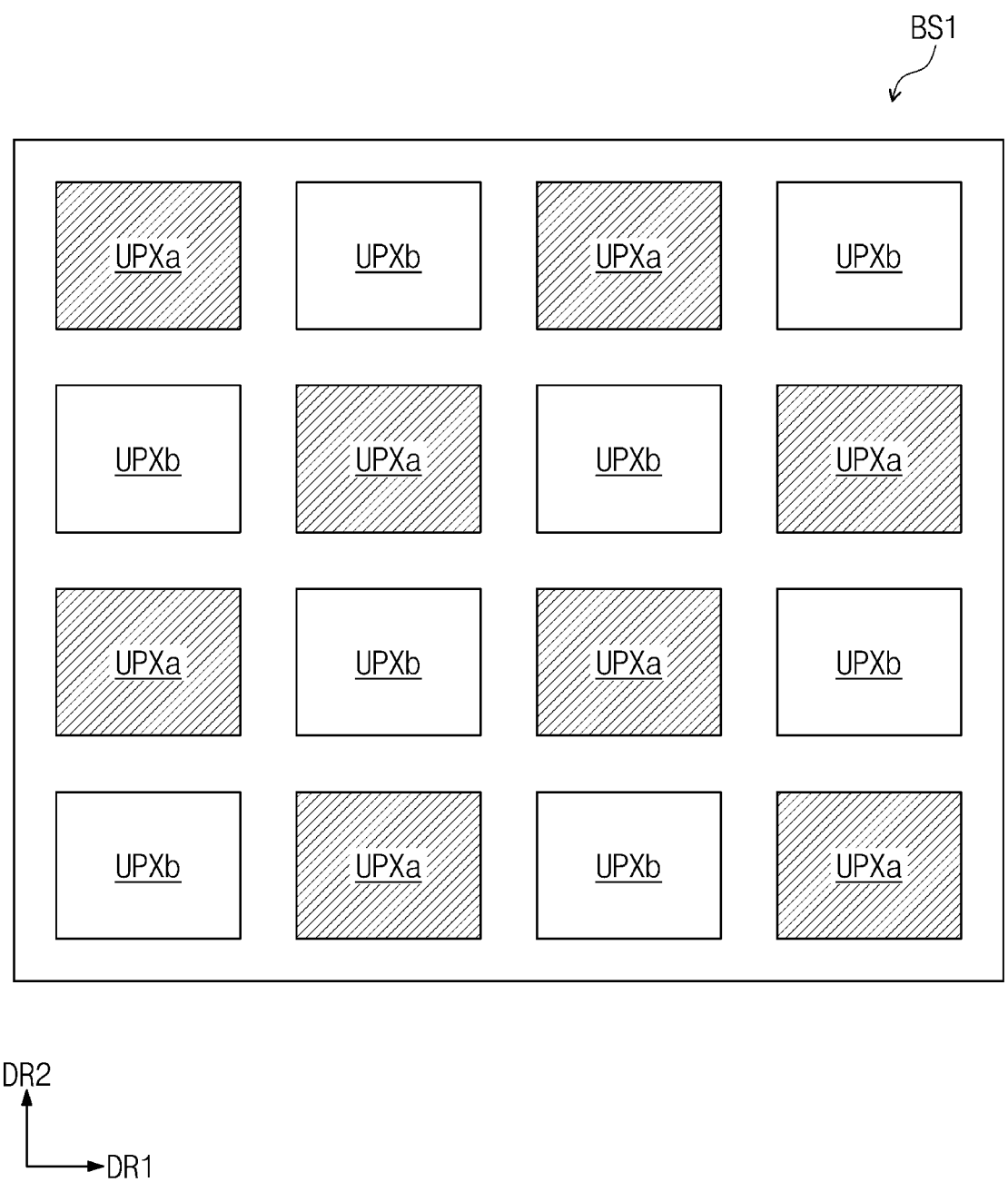
FIGS. 11, 12, and 13 show exemplary arrangements of ultrasound sensors of a biometric sensor according to exemplary embodiments of the present inventive concepts.
Figure 12:
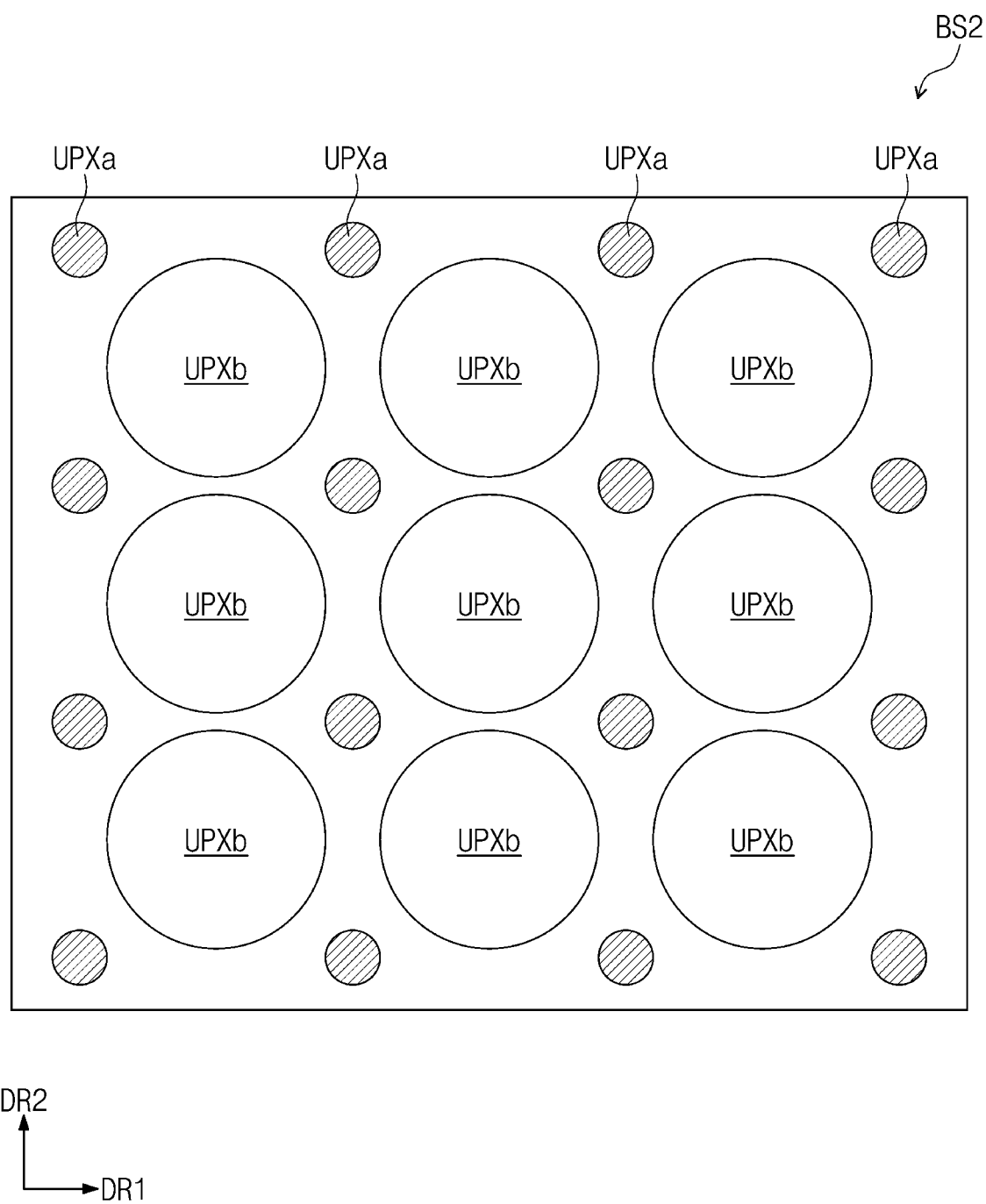
Figure 13:
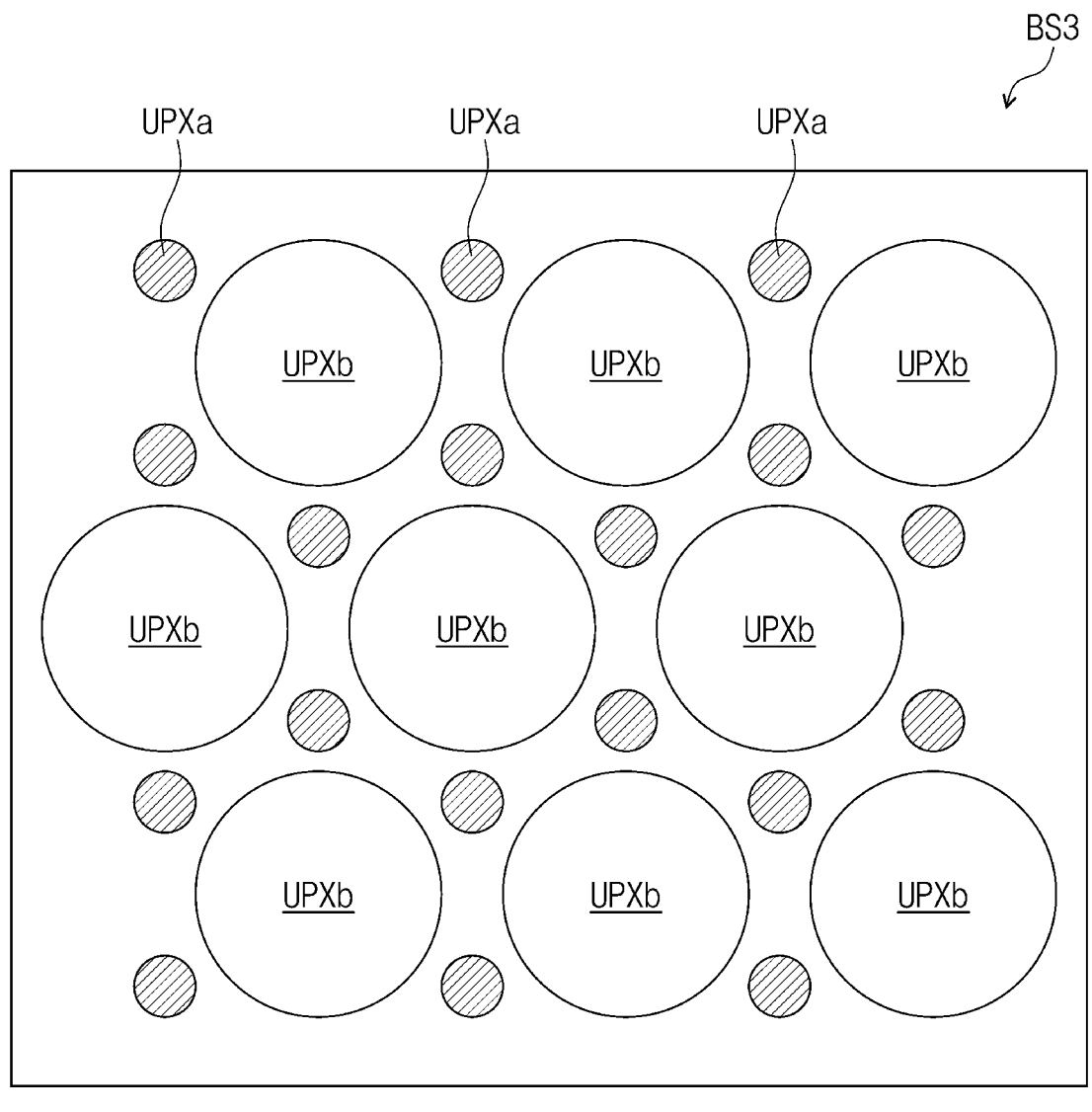

FIGS. 11, 12, and 13 show arrangements of ultrasonic sensors of the biometric sensors BS1, BS2 and BS2 according to exemplary embodiments of the present inventive concepts.

Referring to FIG. 11, the biometric sensor BS1 includes a plurality of first detection sensors UPXa and a plurality of second detection sensors UPXb. The first detection sensors UPXa and the second detection sensors UPXb may be arranged in a matrix type array in a plane defined by the first direction DR and the second direction DR2. In addition, the first detection sensors UPXa and the second detection sensors UPXb may be alternately arranged in the first direction DR1 and the second direction DR2.

The first detection sensors UPXa are sensors capable of generating ultrasonic signals of a first frequency (e.g., about 10 MHz to about 20 MHz) suitable for fingerprint detection. The second detection sensors UPXb are sensors capable of generating ultrasonic signals of a second frequency (e.g., about 10 kHz to about 50 kHz) suitable for skin condition detection.

The first detection sensors UPXa may output the first transmission signal TX_UF of the first frequency in the fingerprint sensing mode, and receive feedback ultrasonic signals including fingerprint information. The second detection sensors UPXb may output the second transmission signal TX_US of the second frequency in the skin measuring mode, and receive feedback ultrasonic signals including skin condition information.

In the exemplary embodiment shown in FIG. 11, the first detection sensors UPXa and the second detection sensors UPXb are illustrated to have a square shape that are of the same size (e.g., area in the first direction DR1 and the second direction DR2). However, exemplary embodiments of the present inventive concepts are not limited thereto and the first detection sensors UPXa and the second detection sensors UPXb may have different shaped and sizes (e.g., areas in the first direction DR1 and second direction DR2). The shape and area of each of the first detection sensors UPXa and the second detection sensors UPXb may be substantially similar to those of the ultrasonic transducer UT (see FIG. 9).

In addition, the shapes and arrangements of the first detection sensors UPXa and the second detection sensors UPXb may be changed in various ways. In an exemplary embodiment, the biometric sensor BS1 may include the larger number of the first detection sensors UPXa than the second detection sensors UPXb to enhance fingerprint sensing characteristics in the fingerprint sensing mode.

Referring to the exemplary embodiment of FIG. 12, the biometric sensor BS2 includes first detection sensors UPXa and second detection sensors UPXb. The first detection sensors UPXa and the second detection sensors UPXb may have circular shapes respectively, and have different sizes (e.g., areas in the first direction DR1 and the second direction DR2). For example, the first detection sensors UPXa for generating the first transmission signal TX_UF may have a smaller size than the second detection sensors UPXb for generating the second transmission signal TX_US. Typically, as a frequency of the ultrasonic signal generated from the ultrasonic transducer UT (see FIG. 9) becomes higher, the size (e.g., area in the first direction DR1 and the second direction DR2) of the ultrasonic transducer UT gets larger. In addition, when the ultrasonic transducer UT has a circular shape, a wavelength of the ultrasonic signal may not be influenced by an irradiation direction when the ultrasonic signal is output.

In the exemplary embodiment illustrated in FIG. 12, the first detection sensors UPXa are disposed between four adjacent second detection sensors UPXb (e.g., adjacent in the first direction DR1 and second directions DR2). The resolutions of signals sensed by the first detection sensors UPXa and the second detection sensors UPXb may be enhanced by minimizing the separation distance between the first detection sensors UPXa, the separation distance between the second detection sensors UPXb, and the separation distance between the first detection sensors UPXa and the second detection sensors UPXb, and by arranging, within a limited area, maximum numbers of the first detection sensors UPXa and the second detection sensors UPXb.

Referring to the exemplary embodiment shown in FIG. 13, the biometric sensor BS3 includes first detection sensors UPXa and second detection sensors UPXb. The first detection sensors UPXa and the second detection sensors UPXb may have circular shapes respectively, and have different sizes (e.g., areas in the first direction DR1 and second direction DR2). For example, the second detection sensors UPXb for generating the second transmission signal TX_US are larger than the first detection sensors UPXa for generating the first transmission signal TX_UF. The first detection sensors UPXa may be disposed around the second detection sensors UPXb.

The number of the first detection sensors UPXa disposed in the biometric sensor BS3 may be greater than the number of the second detection sensors UPXb. Accordingly, the biometric sensor BS3 illustrated in the exemplary embodiment of FIG. 13 may perform a higher resolution fingerprint sensing as compared to the biometric sensor B2 illustrated in the exemplary embodiment of FIG. 12.

Figure 14:
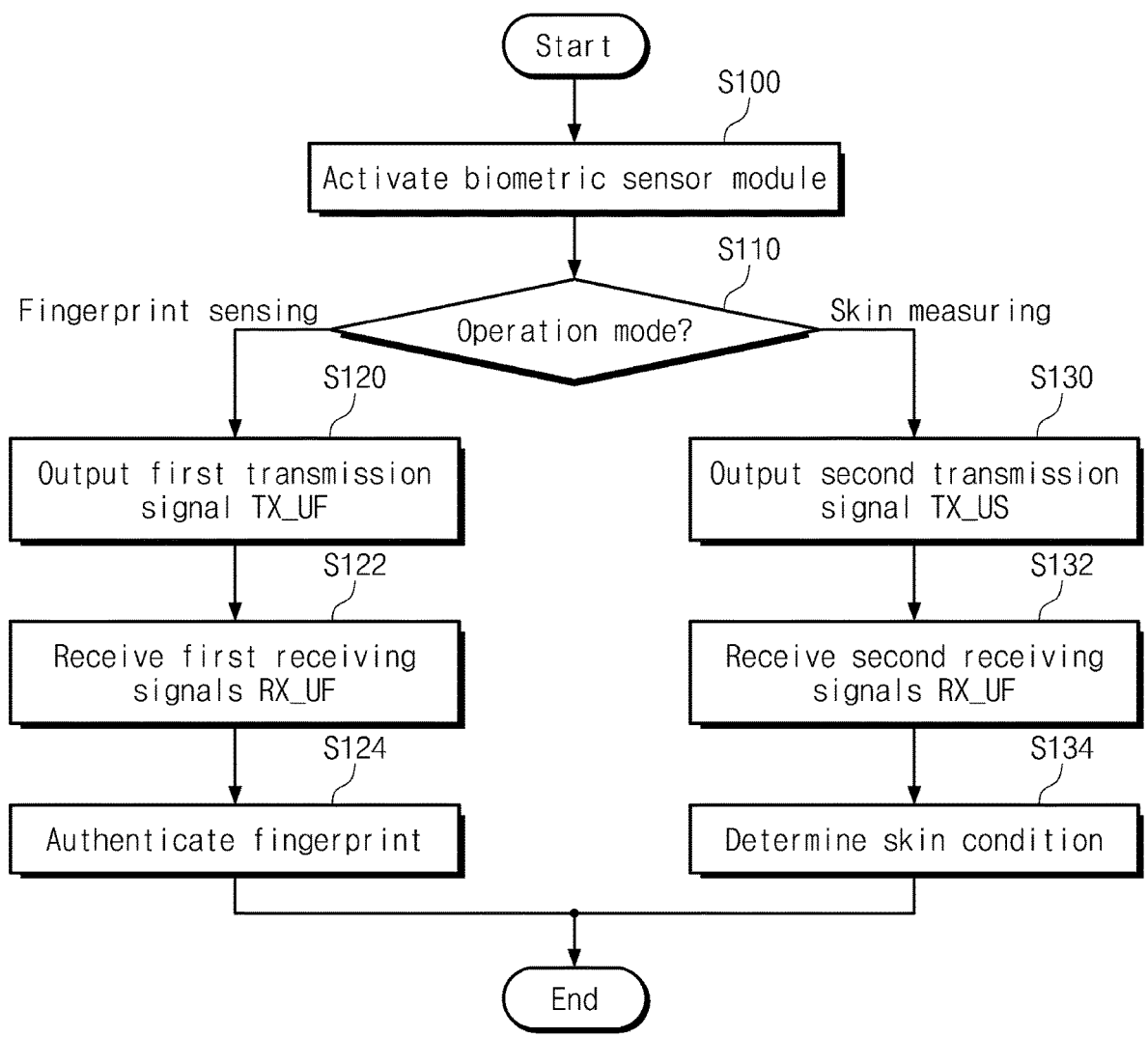
FIG. 14 is a flowchart showing a method of operating a display device according to an exemplary embodiment of the present inventive concepts.

FIG. 14 is a flowchart showing a display device according to an exemplary embodiment of the present inventive concepts.

For convenience of explanation, an operation of the display device will be provided with reference to FIGS. 6 and 8.

Referring to FIGS. 6, 8 and 14, in block S100, a biometric sensor control circuit BSC of the display device DD activates the biometric sensor module SM in response to a request from an application program. For example, the activation of the biometric sensor module SM may include a sequence of operations for controlling power supplying to the biometric sensor module SM to be started, and for initializing the control signals.

In block S110, the biometric sensor control circuit BSC of the display device DD determines an operation mode. For example, when the request from the application program is the fingerprint sensing mode for user authentication, the biometric sensor control circuit BSC transmits a mode signal to the biometric sensor BS so that the biometric sensor BS operates in the fingerprint sensing mode.

In block S120, the biometric sensor BS controls the detection sensors UPX to output the first transmission signal TX_UF when the mode signal from the biometric sensor control circuit BSC indicates the fingerprint sensing mode. In an exemplary embodiment, the first detection signal TX_UF may be an ultrasonic signal of the first frequency (about 10 MHz to about 20 MHz) suitable to fingerprint sensing.

In block S122, the detection sensors UPX receive signals reflected by the ridges and valleys from the user input TC in the sensing area SA (see FIG. 1), and provide the received signals RX1 to RXm to the biometric sensor control circuit BSC as the first receiving signals RX_UF.

In block S124, the biometric sensor control circuit BSC may provide user authentication information to the application program on the basis of the first receiving signals RX_UF. However, exemplary embodiments of the present inventive concepts are not limited thereto.

In block S110, when the request from the application program is the skin measuring mode, the biometric sensor control circuit BSC transmits the mode signal to the biometric sensor BS so that the biometric sensor BS operates in the skin measuring mode.

In block S130, the biometric sensor BS controls the detection sensors UPX to output the second transmission signal TX_US when the mode signal from the biometric sensor control circuit BSC indicates the skin measuring mode. In an exemplary embodiment, the second transmission signal TX_US may be an ultrasonic signal of the second frequency (about 10 kHz to about 50 kHz) suitable for skin condition sensing.

In block S132, the detection sensors UPX receive signals reflected by a prescribed part (e.g., a dermal layer) from the user input TC in the sensing area SA (see FIG. 1), and provide the received signals RX1 to RXm to the biometric sensor control circuit BSC as the second receiving signals RX_US.

In block S134, the biometric sensor control circuit BSC may provide skin measurement information to the application program on the basis of the second receiving signals RX_US.

According to the operation method of such a display device, not only a fingerprint but also the skin elasticity may be measured using the biometric detection sensor for sensing a biometric fingerprint input. Accordingly, user convenience may be increased.

The display device having the above-described configuration may measure the skin elasticity using a biometric sensor for sensing a biometric fingerprint input. Accordingly, user convenience may be increased.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed. In addition, exemplary embodiments disclosed in the present disclosure are not intended to limit the technical spirit of the present inventive concepts, and the protection scope of the present invention should be interpreted based on the following appended claims and it should be appreciated that all technical spirits included within a range equivalent thereto are included in the protection scope of the present inventive concepts.

What is claimed is:
1. A display device comprising:
a display panel comprises an image area in which an image is displayed; and
a biometric sensor module disposed on the display panel, the biometric sensor module is an ultrasonic sensor module,
wherein the biometric sensor module is configured to:
output a first transmission signal having a first frequency to a sensing area corresponding to at least a partial portion of the image area in a fingerprint sensing mode;
sense fingerprint information corresponding to the first transmission signal;
output a second transmission signal having a second frequency that is different from the first frequency to the sensing area in a skin measuring mode; and
sense skin condition information corresponding to the second transmission signal,
wherein the biometric sensor module comprises:
first detection sensors configured to transmit the first transmission signal having the first frequency in the fingerprint sensing mode; and
second detection sensors configured to transmit the second transmission signal having the second frequency in the skin measuring mode,
wherein each of the second detection sensors has a larger size than a size of each of the first detection sensors.

2. The display device of claim 1, wherein the biometric sensor module further comprises:
a selection circuit configured to control operations of the first detection sensors and the second detection sensors; and
an output circuit configured to output a receiving signal corresponding to the fingerprint information and the skin condition information sensed by the first detection sensors and the second detection sensors.

3. The display device of claim 2, wherein the output circuit is configured to:
output a first receiving signal corresponding to the fingerprint information in the fingerprint sensing mode; and
output a second receiving signal corresponding to the skin condition information in the skin measuring mode.

4. The display device of claim 1, wherein the first detection sensors and the second detection sensors are alternately arranged.

5. The display device of claim 1, wherein a total number of the first detection sensors is greater than a total number of the second detection sensors.

6. The display device of claim 1, wherein the first frequency of the first transmission signal is lower than the second frequency of the second transmission signal.

7. The display device of claim 1, wherein the first frequency of the first transmission signal has a range of about 10 MHz to 20 MHz, and the second frequency of the second transmission signal has a range of about 10 kHz to 50 KHz.

8. The display device of claim 1, wherein:
the second transmission signal is reflected by skin cells of a user; and
the skin condition information is sensed in the skin measuring mode based on a degree of density of the skin cells of the user.

9. A method for operating a display device, having a display panel configured to display an image and a biometric sensor module, the method comprising:
determining an operation mode comprising a fingerprint sensing mode or a skin measuring mode;
controlling first detection sensors of the biometric sensor module to output a first transmission signal having a first frequency to a sensing area corresponding to an image area of the display panel in which an image is displayed when the operation mode is determined to be the fingerprint sensing mode;
controlling second detection sensors of the biometric sensor module to sense fingerprint information corresponding to the first transmission signal;
controlling the biometric sensor module to output a second transmission signal having a second frequency that is different from the first frequency to the sensing area when the operation mode is determined to be the skin measuring mode; and
controlling the biometric sensor module to sense skin condition information corresponding to the second transmission signal,
wherein the biometric sensor module is an ultrasonic sensor module,
wherein the first transmission signal and the second transmission signal are each an ultrasonic signal, and
wherein each of the second detection sensors has a larger size than a size of each of the first detection sensors.

10. The method of claim 9, further comprising:
receiving a reflected first transmission signal to detect the fingerprint information when the operation mode is the fingerprint sensing mode; and
receiving a reflected second transmission signal to detect the skin condition information when the operation mode is the skin measuring mode.

11. The method of claim 9, wherein:
the first frequency of the first transmission signal is lower than the second frequency of the second transmission signal.

12. The method of claim 9, wherein:
the second transmission signal is reflected by skin cells of a user; and
the skin condition information is sensed in the skin measuring mode based on a degree of density of the skin cells of the user.

* * * * *